US010678868B2

(12) United States Patent
Carlsson et al.

(10) Patent No.: US 10,678,868 B2
(45) Date of Patent: *Jun. 9, 2020

(54) SYSTEMS AND METHODS FOR METRIC DATA SMOOTHING

(71) Applicant: Ayasdi AI LLC, Menlo Park, CA (US)

(72) Inventors: Gunnar Carlsson, Stanford, CA (US); Anthony Bak, San Francisco, CA (US); Jennifer Kloke, Mountain View, CA (US); Benjamin Mann, Austin, TX (US); Harlan Sexton, Palo Alto, CA (US)

(73) Assignee: Ayasdi AI LLC, Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/125,251

(22) Filed: Sep. 7, 2018

(65) Prior Publication Data

US 2019/0005036 A1  Jan. 3, 2019

Related U.S. Application Data

(63) Continuation of application No. 14/533,058, filed on Nov. 4, 2014, now Pat. No. 10,114,823.

(60) Provisional application No. 61/899,786, filed on Nov. 4, 2013.

(51) Int. Cl.
*H04L 12/00* (2006.01)
*G06F 16/93* (2019.01)
*G06F 16/33* (2019.01)

(52) U.S. Cl.
CPC .......... *G06F 16/93* (2019.01); *G06F 16/3334* (2019.01)

(58) Field of Classification Search
CPC .............................. G06F 16/3334; G06F 16/93
USPC ................................... 707/737; 709/201, 203
See application file for complete search history.

(56) References Cited

U.S. PATENT DOCUMENTS

| 5,857,179 A | 1/1999 | Vaithyanathan |
| 6,289,933 B1 | 9/2001 | Fischer |
| 6,701,305 B1 | 3/2004 | Holt |
| 6,728,932 B1 | 4/2004 | Chundi |
| 6,757,646 B2 | 6/2004 | Marchisio |
| 6,804,688 B2 | 10/2004 | Kobayashi |
| 6,847,966 B1 | 1/2005 | Sommer |
| 6,925,432 B2 | 8/2005 | Lee |
| 6,996,575 B2 | 2/2006 | Cox |
| 7,039,554 B2 * | 5/2006 | Nguyen ............. G05B 23/0221 702/179 |

(Continued)

*Primary Examiner* — Frantz Coby
(74) *Attorney, Agent, or Firm* — Ahmann Kloke LLP

(57) ABSTRACT

An exemplary method may comprise receiving a matrix for a set of documents, each cell of the matrix including a frequency value indicating a number of instances of a corresponding text segment in a corresponding document, receiving an indication of a relationship between two text segments, each of the two text segments associated with a first column and a second column, respectively, of the matrix, adjusting, for each document, a frequency value of the second column based on the frequency value of the first column, projecting each frequency value into a reference space to generate a set of projection values, identifying a plurality of subsets of the reference space, clustering, for each subset of the plurality of subsets, at least some documents that correspond to projection values, and generating a graph of nodes, each of the nodes identifying one or more of the documents corresponding to each cluster.

26 Claims, 21 Drawing Sheets

(56) References Cited

U.S. PATENT DOCUMENTS

| | | |
|---|---|---|
| 7,158,983 B2 | 1/2007 | Willse |
| 7,167,811 B2 * | 1/2007 | Tabor .................... G01R 31/01 |
| | | 324/76.11 |
| 7,373,287 B2 * | 5/2008 | Asper .................... G06F 30/15 |
| | | 703/8 |
| 7,499,923 B2 | 3/2009 | Kawatani |
| 7,865,332 B2 * | 1/2011 | Ramsey .................. G06F 17/18 |
| | | 702/180 |
| 8,606,787 B1 | 12/2013 | Asgekar |
| 9,342,591 B2 | 5/2016 | Inagaki |
| 2002/0042793 A1 | 4/2002 | Choi |
| 2002/0065857 A1 | 5/2002 | Michalewicz |
| 2004/0138846 A1 * | 7/2004 | Buxton ............. G05B 23/0229 |
| | | 702/108 |
| 2005/0255483 A1 * | 11/2005 | Orr ...................... C12Q 1/6851 |
| | | 435/6.11 |
| 2006/0106767 A1 | 5/2006 | Adcock |
| 2008/0255761 A1 * | 10/2008 | Wang ....................... G01V 1/28 |
| | | 702/17 |
| 2010/0313157 A1 | 12/2010 | Carlsson |
| 2011/0264997 A1 | 10/2011 | Mukerjee |
| 2013/0013612 A1 | 1/2013 | Fittges |
| 2013/0144916 A1 | 6/2013 | Lum |
| 2013/0212106 A1 | 8/2013 | Inagaki |
| 2014/0164388 A1 | 6/2014 | Zhang |
| 2014/0229408 A1 | 8/2014 | Vijayaraghavan |
| 2015/0074124 A1 | 3/2015 | Sexton |
| 2015/0127650 A1 * | 5/2015 | Carlsson ............. G06F 16/3334 |
| | | 707/737 |
| 2015/0142707 A1 | 5/2015 | Charif |

* cited by examiner

SYSTEMS AND METHODS FOR METRIC DATA SMOOTHING

CROSS REFERENCE TO RELATED APPLICATIONS

This application is a continuation of U.S. patent application Ser. No. 14/533,058, filed Nov. 4, 2014 and entitled "Systems and Methods for Metric Data Smoothing," which claims priority to U.S. Provisional Patent Application Ser. No. 61/899,786, filed Nov. 4, 2013 and entitled "Transforming Data, Metrics, and Lenses with Auxiliary Information," which are hereby incorporated by reference herein.

BACKGROUND

1. Field of the Invention

Embodiments of the present invention are directed data analysis and more particularly to smoothing of data for analysis.

2. Related Art

As the collection and storage data has increased, there is an increased need to analyze and make sense of large amounts of data. Examples of large datasets may be found in financial services companies, oil expiration, biotech, and academia. Unfortunately, previous methods of analysis of large multidimensional datasets tend to be insufficient (if possible at all) to identify important relationships and may be computationally inefficient.

In one example, previous methods of analysis often use clustering. Clustering is often too blunt an instrument to identify important relationships in the data. Similarly, previous methods of linear regression, projection pursuit, principal component analysis, and multidimensional scaling often do not reveal important relationships. Existing linear algebraic and analytic methods are too sensitive to large scale distances and, as a result, lose detail.

Further, even if the data is analyzed, sophisticated experts are often necessary to interpret and understand the output of previous methods. Although some previous methods allow graphs depicting some relationships in the data, the graphs are not interactive and require considerable time for a team of such experts to understand the relationships. Further, the output of previous methods does not allow for exploratory data analysis where the analysis can be quickly modified to discover new relationships. Rather, previous methods require the formulation of a hypothesis before testing.

SUMMARY OF THE INVENTION(S)

Exemplary systems and methods for metric data smoothing are provided. An example method may comprise receiving a matrix for a set of documents, each row of the matrix corresponding to each document of the set of documents and each column of the matrix corresponding to a text segment that may be in any of the set of documents, each cell of the matrix including a frequency value indicating a number of instances of a corresponding text segment in a corresponding document, receiving an indication of a relationship between two text segments, each of the two text segments associated with a first column and a second column, respectively, of the matrix, adjusting, for each document, a frequency value of the second column based on the frequency value of the first column, projecting each frequency value of the matrix into a reference space to generate a set of projection values in the reference space, identifying a plurality of subsets of the reference space, at least some of the plurality of subsets including at least some of the projection values, clustering, for each subset of the plurality of subsets, at least some documents of the set of documents that correspond to projection values that are members of that subset to generate clusters of one or more documents, and generating a graph of nodes, each of the nodes identifying one or more of the documents corresponding to each cluster.

In various embodiments, clustering, for the each subset of the plurality of subsets, at least some documents of the set of documents may comprise determining a distance between at least two documents of the set of documents corresponding to at least two projection values in a first subset of the plurality of subsets, comparing the distance to a threshold value, and clustering each of the at least two documents in two different clusters or one cluster based on the comparison. Generating the graph of nodes may comprise generating a graphical representation of the graph of nodes.

The method may further comprise comprising generating a link between at least two nodes of the graph of nodes, each node corresponding to different clusters, a first document of the set of documents being a member of the different clusters. Generating the graph of nodes may comprise generating a graphical representation of the graph of nodes and generating the link comprises generating an edge between the at least two nodes. The plurality of subsets of the reference space may have a non-empty intersection.

In some embodiments, adjusting, for each document, a frequency value may comprise generating a third column of the matrix, each cell of the third column containing the adjusted frequency value for the corresponding document and the second column of frequency values remains unchanged. Projecting each frequency value may comprise projecting each frequency value, including each of the adjusted frequency values, into the reference space to generate the set of projection values in the reference space. The second column may remain unchanged.

In various embodiments, the text segments are from at least one dictionary of text segments. The one or more of the text segments are words and/or n-grams. In some embodiments, each frequency value is a term frequency-inverse document frequency for the corresponding text segment and the corresponding document.

An exemplary system comprises an input module, a smoothing module, and an analysis module. The input module may be configured to receive a matrix for a set of documents, each row of the matrix corresponding to each document of the set of documents and each column of the matrix corresponding to a text segment that may be in any of the set of documents, each cell of the matrix including a frequency value indicating a number of instances of a corresponding text segment in a corresponding document. The smoothing module may be configured to receive an indication of a relationship between two text segments, each of the two text segments associated with a first column and a second column, respectively, of the matrix and to adjust, for each document, a frequency value of the second column based on the frequency value of the first column. The analysis module may be configured to project each frequency value of the matrix into a reference space to generate a set of projection values in the reference space, to identify a plurality of subsets of the reference space, at least some of the plurality of subsets including at least some of the projection values, to cluster, for each subset of the plurality of subsets, at least some documents of the set of documents that correspond to projection values that are members of that subset to generate clusters of one or more documents, and to generate a graph of nodes, each of the nodes identifying one or more of the documents corresponding to each cluster.

The system may further comprise a visualization module configured to generate a graphical representation of the graph of nodes. The analysis module may be further configured to generate a link between at least two nodes of the graph of nodes, each node corresponding to different clusters, a first document of the set of documents being a member of the different clusters. In some embodiments, a visualization module configured generating an edge between the at least two nodes.

In some embodiments, the plurality of subsets of the reference space have a non-empty intersection. The smoothing module may be configured to adjust, for each document, a frequency value comprises the smoothing module configured to generate a third column of the matrix, each cell of the third column containing the adjusted frequency value for the corresponding document and the second column of frequency values remains unchanged.

The analysis module configured to project each frequency value may comprise the analysis module configured to project each frequency value, including each of the adjusted frequency values, into the reference space to generate the set of projection values in the reference space. In some embodiments, second column remains unchanged.

An exemplary computer readable medium comprising instructions. The instructions may be executable by a processor to perform a method. The method may comprise receiving a matrix for a set of documents, each row of the matrix corresponding to each document of the set of documents and each column of the matrix corresponding to a text segment that may be in any of the set of documents, each cell of the matrix including a frequency value indicating a number of instances of a corresponding text segment in a corresponding document, receiving an indication of a relationship between two text segments, each of the two text segments associated with a first column and a second column, respectively, of the matrix, adjusting, for each document, a frequency value of the second column based on the frequency value of the first column, projecting each frequency value of the matrix into a reference space to generate a set of projection values in the reference space, identifying a plurality of subsets of the reference space, at least some of the plurality of subsets including at least some of the projection values, clustering, for each subset of the plurality of subsets, at least some documents of the set of documents that correspond to projection values that are members of that subset to generate clusters of one or more documents, and generating a graph of nodes, each of the nodes identifying one or more of the documents corresponding to each cluster.

DETAILED DESCRIPTION OF EMBODIMENTS

Figure 1:
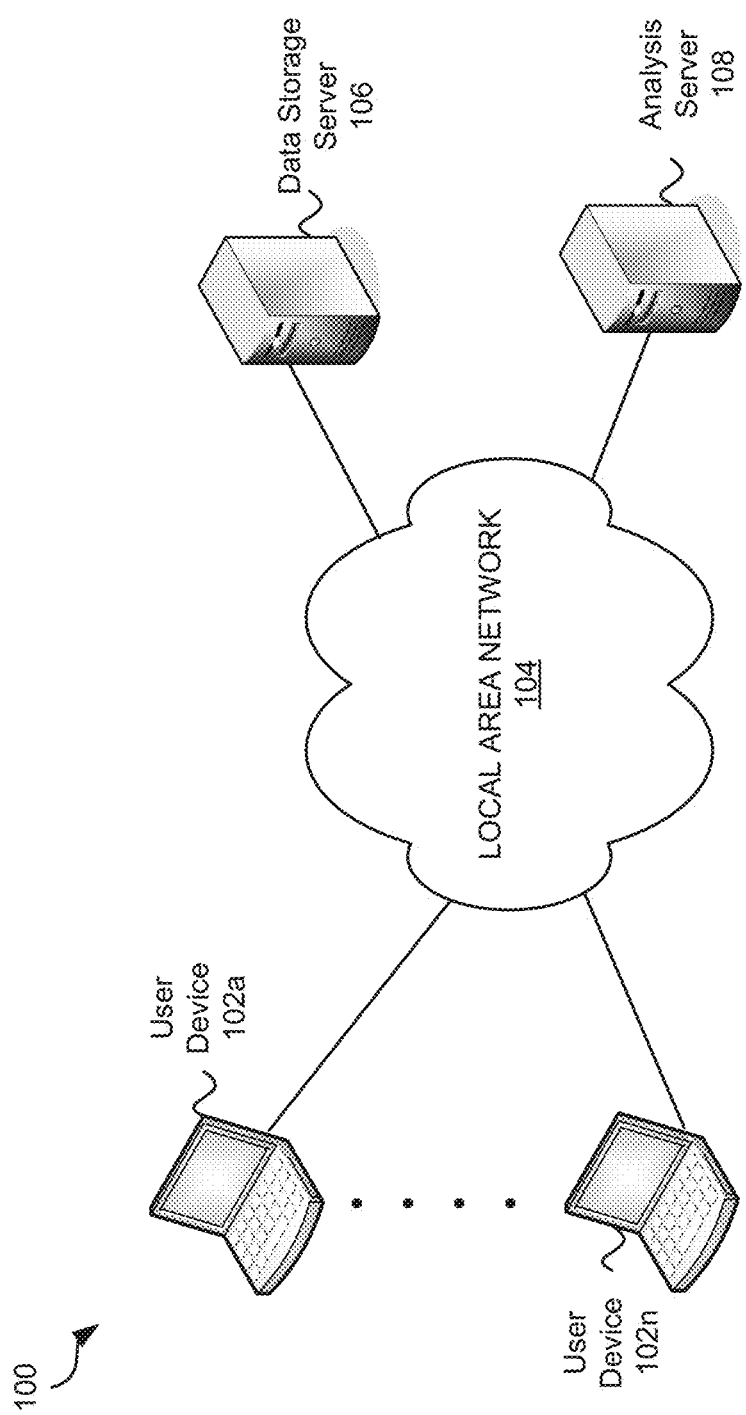
FIG. 1 is an exemplary environment in which embodiments may be practiced.

Various embodiments described herein are described as part of data analytics using Topological Data Analysis (TDA). Those skilled in the art will appreciate that many different data analytic approaches, not just TDA, may be used in some or all of the embodiments described herein.

Generally, TDA is an area of research which had been developed over the past decade and a half, and has produced methods for studying point cloud data sets from a geometric point of view. Data is analyzed by approximation via models of various types. For example, regression methods may be used to model data as the graph of a function in one or more variables. Certain qualitative properties may be of a great deal of importance for understanding the data, however, these features may not be readily represented within such a model.

Data may be depicted using an approach with TDA. In one example, a visualization (e.g., a graph) of the data using approaches in TDA may depict the data as being divided into three disconnected groups. Seeing that the data breaks into groups in this fashion can give insight into the data, once one understands what characterizes the groups.

Aspects of the shape (e.g., as may be depicted in the visualization) of the data may be relevant in reflecting information about the data. Connectedness (e.g., a simple property of shape) may reflect the presence of a discrete classification of the data into disparate groups. The presence of loops, another simple aspect of shape, often reflects periodic or recurrent behavior. Further, a shape containing flares may suggest a classification of the data descriptive of ways in which phenomena can deviate from the norm, which may be represented by the central core. These examples support the idea that the shape of data (suitably defined) may be an important aspect of its structure, and that it may be important to develop methods for analyzing and understanding its shape. The part of mathematics which concerns itself with the study of shape is called topology.

One question is how notions of geometry or shape are translated into information about point clouds, which are, after all, finite sets. In some embodiments, shape or geometry can be defined by a dissimilarity function or metric (e.g., a non-negative, symmetric, real-valued function d on a set of pairs of points in a data set which may also satisfy the triangle inequality, and that $d(x,y)=0$ if and only if $x=y$). There may be any number of such functions for any number of data sets. For example, when data comes in the form of a numerical matrix, where the rows correspond to the data points and the columns are the fields describing the data, the n-dimensional Euclidean distance function may be natural when there are n fields. Other choices may include Pearson correlation distances, cosine distances, and other choices. When the data is not Euclidean (e.g., genomic sequences), various notions of distance may be defined using measures of similarity based on Basic Local Alignment Search Tool (BLAST) type similarity scores.

A measure of similarity can come in non-numeric forms, such as, but not limited to, social networks of friends or similarities of hobbies, buying patterns, tweeting, or professional interests. In any of these ways the notion of shape can be formulated via the establishment of a useful notion of similarity of data points. One of the advantages of TDA is that TDA may depend on nothing more than such a notion, which may be a very primitive or low-level model. TDA may, for example, rely on many fewer assumptions than standard linear or algebraic models.

The following is an exemplary summary of properties that may be used for representing the shape of data sets in a useful, understandable fashion:

Received data may be a collection of data points equipped in some way with a distance or dissimilarity function, or other description. For example, the distance or dissimilarity function (or similarity function) may be given implicitly when the data is in the form of a matrix, or explicitly as a matrix of distances or even the generating edges of a mathematical network.

One or more lens functions may also be used (i.e., one or more real valued functions on the data). Selection of one or more lens functions may depend on the metric. For example, selection of the one or more lens functions may be the result of a density estimator or a measure of centrality or data depth. Selection of one or more lens functions may also depend on a particular representation of the data, as when one uses the first one or two coordinates of a principal component or multidimensional scaling analysis. Alternately, selection of one or more lens functions may be based on columns within the received data which is intrinsically interesting, as in cholesterol levels and BMI in a study of heart disease.

Two or more processing parameters (e.g., resolution and gain) may be used. Increase in resolution typically results in more nodes, and an increase in the gain increases the number of edges. The parameters, nodes, and edges are further described herein.

The output may be a visualization (e.g., a display of connected nodes or "Network") or simplicial complex. An exemplary specific combinatorial formulation is that the vertices form a finite set, and then the additional structure is a collection of edges (unordered pairs of vertices) which are pictured as connections in this network.

Utilizing TDA methodology may provide the following exemplary capabilities:

New ways of visualizing and compressing data sets, which may facilitate understanding and monitoring data Enables the study of interrelationships among disparate data sets Enables multiscale/multiresolution study of data sets.

Optional interactivity in the analysis of data, using point and click methods

TDA may be a very useful complement to more traditional methods, such as Principal Component Analysis (PCA), multidimensional scaling, and hierarchical clustering. These existing methods are often quite useful, but suffer from significant limitations. PCA, for example, is an essentially linear procedure and, as a result there are limits to its utility in highly non-linear situations. Multidimensional scaling is a method which is not intrinsically linear, but can, in many situations, wash out detail since it may overweight large distances. In addition, when metrics do not satisfy an intrinsic flatness condition, it will have difficulty in faithfully representing the data. Hierarchical clustering does exhibit multiscale behavior, but represents data only as disjoint clusters, rather than retaining any of the geometry of the data set. In all three cases, these limitations matter for many varied kinds of data.

FIG. 1 is an exemplary environment 100 in which embodiments may be practiced. Various embodiments performed regarding FIG. 1 and at least some embodiments described herein may be part of TDA of a data set. Environment 100 comprises user devices 102a-102n, a communication network 104, data storage server 106, and analysis server 108. The environment 100 depicts an embodiment wherein functions are performed across a network. In this example, the user(s) may take advantage of cloud computing by storing data in a data storage server 106 over a communication network 104. The analysis server 108 may perform analysis and generation of an interactive visualization.

User devices 102a-102n may be any digital devices. A digital device is any device that comprises memory and a processor. Digital devices are further described with regard to FIG. 2 and FIG. 21. The user devices 102a-102n may be any kind of digital device that may be used to access, analyze and/or view data including, but not limited to a desktop computer, laptop, notebook, or other computing device.

In various embodiments, a user, such as a data analyst, may generate a database or other data structure with the user device 102a to be saved to the data storage server 106. The user device 102a may communicate with the analysis server 108 via the communication network 104 to perform analysis, examination, and visualization of data within the database.

The user device 102a may comprise a client program for interacting with one or more applications on the analysis server 108. In other embodiments, the user device 102a may communicate with the analysis server 108 using a browser or other standard program. In various embodiments, the user device 102a communicates with the analysis server 108 via a virtual private network. Those skilled in the art will appreciate that that communication between the user device 102a, the data storage server 106, and/or the analysis server 108 may be encrypted or otherwise secured.

The communication network 104 may be any network that allows digital devices to communicate. The communication network 104 may be the Internet and/or include LAN and WANs. The communication network 104 may support wireless and/or wired communication.

The data storage server 110 is a digital device that is configured to store data. In various embodiments, the data storage server 110 stores databases and/or other data structures. The data storage server 110 may be a single server or a combination of servers. In one example the data storage server 110 may be a secure server wherein a user may store data over a secured connection (e.g., via https). The data may be encrypted and backed-up. In some embodiments, the data storage server 106 is operated by a third-party such as Amazon's S3 service.

The database or other data structure may comprise large high-dimensional datasets. These datasets are traditionally very difficult to analyze and, as a result, relationships within the data may not be identifiable using previous methods. Further, previous methods may be computationally inefficient.

The analysis server 108 is a digital device that may be configured to analyze data. In various embodiments, the analysis server may perform many functions to interpret, examine, analyze, and display data and/or relationships within data. In some embodiments, the analysis server 108 performs, at least in part, topological analysis of large datasets applying metrics, filters, and resolution parameters chosen by the user. An exemplary method for analysis is further discussed regarding FIGS. 3, 4, and 8 herein.

The analysis server 108 may generate an interactive visualization of the output of the analysis. The interactive visualization allows the user to observe and explore relationships in the data. In various embodiments, the interactive visualization allows the user to select nodes comprising data that has been clustered. The user may then access the underlying data, perform further analysis (e.g., statistical analysis) on the underlying data, and manually reorient the graph(s) (e.g., structures of nodes and edges described herein) within the interactive visualization. The analysis server 108 may also allow for the user to interact with the data, see the graphic result. The interactive visualization is further discussed regarding FIGS. 6, 7, and 20.

In some embodiments, the analysis server 108 interacts with the user device(s) 102a-102n over a private and/or secure communication network. The user device 102a may comprise a client program that allows the user to interact with the data storage server 106, the analysis server 108, another user device (e.g., user device 102n), a database, and/or an analysis application executed on the analysis server 108.

Those skilled in the art will appreciate that all or part of the data analysis may occur at the user device 102a. Further, all or part of the interaction with the visualization (e.g., graphic) may be performed on the user device 102a.

Although two user devices 102a and 102n are depicted, those skilled in the art will appreciate that there may be any number of user devices in any location (e.g., remote from each other). Similarly, there may be any number of communication networks, data storage servers, and analysis servers.

Cloud computing may allow for greater access to large datasets (e.g., via a commercial storage service) over a faster connection. Further, those skilled in the art will appreciate that services and computing resources offered to the user(s) may be scalable.

Figure 2:
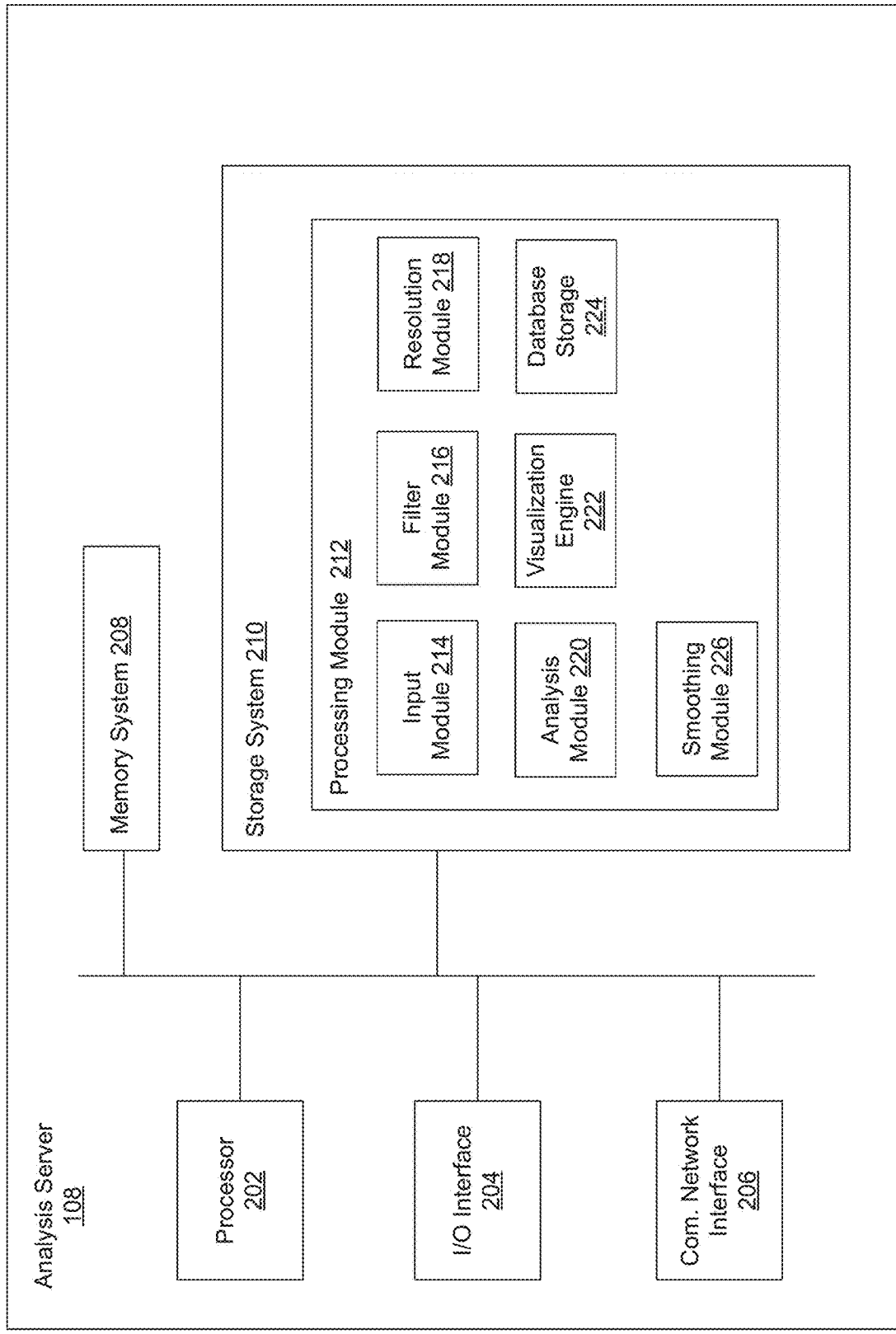
FIG. 2 is a block diagram of an exemplary analysis server.

FIG. 2 is a block diagram of an exemplary analysis server 108. In exemplary embodiments, the analysis server 108 comprises a processor 202, input/output (I/O) interface 204, a communication network interface 206, a memory system 208, and a storage system 210. The processor 202 may comprise any processor or combination of processors with one or more cores.

The input/output (I/O) device 204 may comprise interfaces for various I/O devices such as, for example, a keyboard, mouse, and display device. The exemplary communication network interface 206 is configured to allow the analysis server 108 to communication with the communication network 104 (see FIG. 1). The communication network interface 206 may support communication over an Ethernet connection, a serial connection, a parallel connection, and/or an ATA connection. The communication network interface 206 may also support wireless communication (e.g., 802.11 a/b/g/n, WiMax, LTE, WiFi). It will be apparent to those skilled in the art that the communication network interface 206 can support many wired and wireless standards.

The memory system 208 may be any kind of memory including RAM, ROM, or flash, cache, virtual memory, etc. In various embodiments, working data is stored within the memory system 208. The data within the memory system 208 may be cleared or ultimately transferred to the storage system 210.

The storage system 210 includes any storage configured to retrieve and store data. Some examples of the storage system 210 include flash drives, hard drives, optical drives, and/or magnetic tape. Each of the memory system 208 and the storage system 210 comprises a computer-readable medium, which stores instructions (e.g., software programs) executable by processor 202.

The storage system 210 comprises a plurality of modules utilized by embodiments of the present invention. A module may be hardware, software (e.g., including instructions executable by a processor), or a combination of both. In one embodiment, the storage system 210 comprises a processing module 212 which comprises an input module 214, a filter module 216, a resolution module 218, an analysis module 220, a visualization engine 222, and database storage 224. Alternative embodiments of the analysis server 108 and/or the storage system 210 may comprise more, less, or functionally equivalent components and modules.

The input module 214 may be configured to receive commands and preferences from the user device 102a. In various examples, the input module 214 receives selections from the user which will be used to perform the analysis. The output of the analysis may be an interactive visualization.

The input module 214 may provide the user a variety of interface windows allowing the user to select and access a database, choose fields associated with the database, choose a metric, choose one or more filters, and identify resolution parameters for the analysis. In one example, the input module 214 receives a database identifier and accesses a large multi-dimensional database. The input module 214 may scan the database and provide the user with an interface window allowing the user to identify an ID field. An ID field is an identifier for each data point. In one example, the identifier is unique. The same column name may be present in the table from which filters are selected. After the ID field is selected, the input module 214 may then provide the user with another interface window to allow the user to choose one or more data fields from a table of the database.

Although interactive windows may be described herein, those skilled in the art will appreciate that any window, graphical user interface, and/or command line may be used to receive or prompt a user or user device 102a for information.

The filter module 216 may subsequently provide the user with an interface window to allow the user to select a metric to be used in analysis of the data within the chosen data fields. The filter module 216 may also allow the user to select and/or define one or more filters.

The resolution module 218 may allow the user to select a resolution, including filter parameters. In one example, the user enters a number of intervals and a percentage overlap for a filter.

The analysis module 220 may perform data analysis based on the database and the information provided by the user. In various embodiments, the analysis module 220 performs an algebraic topological analysis to identify structures and relationships within data and clusters of data. Those skilled in the art will appreciate that the analysis module 220 may use parallel algorithms or use generalizations of various statistical techniques (e.g., generalizing the bootstrap to zig-zag methods) to increase the size of data sets that can be processed. Those skilled in the art will appreciate that the analysis module 220 is not limited to algebraic topological analysis but may perform any analysis. An exemplary method for analysis is further discussed regarding FIGS. 3, 4, and 8 herein.

The visualization engine 222 generates an interactive visualization including the output from the analysis module 220. The interactive visualization allows the user to see all or part of the analysis graphically. The interactive visualization also allows the user to interact with the visualization. For example, the user may select portions of a graph from within the visualization to see and/or interact with the underlying data and/or underlying analysis. The user may then change the parameters of the analysis (e.g., change the metric, filter(s), or resolution(s)) which allows the user to visually identify relationships in the data that may be otherwise undetectable using prior means. The interactive visualization is further discussed regarding FIGS. 6, 7, and 20.

The database storage 224 is configured to store all or part of the database that is being accessed. In some embodiments, the database storage 224 may store saved portions of the database. Further, the database storage 224 may be used to store user preferences, parameters, and analysis output thereby allowing the user to perform many different functions on the database without losing previous work.

The smoothing module 226 is configured to perform smoothing operations on all or some of the data received or generated by the input module 214 and/or the filter module 216. In various embodiments, the smoothing module 226 receives an indication of a relationship within the data of a matrix (or relationship in any data received by the processing module 212). The smoothing module 226 may then perform one or more smoothing functions on data that is related within the matrix. The smoothing module 226 is further described herein.

Those skilled in the art will appreciate that that all or part of the processing module 212 may be at the user device 102a or the database storage server 106. In some embodiments, all or some of the functionality of the processing module 212 may be performed by the user device 102a.

In various embodiments, systems and methods discussed herein may be implemented with one or more digital devices. In some examples, some embodiments discussed herein may be implemented by a computer program (instructions) executed by a processor. The computer program may provide a graphical user interface. Although such a computer program is discussed, those skilled in the art will appreciate that embodiments may be performed using any of the following, either alone or in combination, including, but not limited to, a computer program, multiple computer programs, firmware, and/or hardware.

It will be appreciated that although the processing module 212 is depicted as being within the storage system 210, the processing module 212 and/or any components of the processing module may be hardware, software, or a combination of both. For example, any or all components (e.g., modules or engines) of the processing module 212 (e.g., the input module 214, the filter module 216, the resolution module 218, the analysis module 220, the visualization engine 222, the database storage 224, and/or the smoothing module 226) may be software that resides in a storage system 210. Alternately, any or all of the components (e.g., modules or engines) of the processing module 212 may be hardware (e.g., hard wired such as part of an Application-Specific Integrated Circuit (ASIC)).

Figure 3:
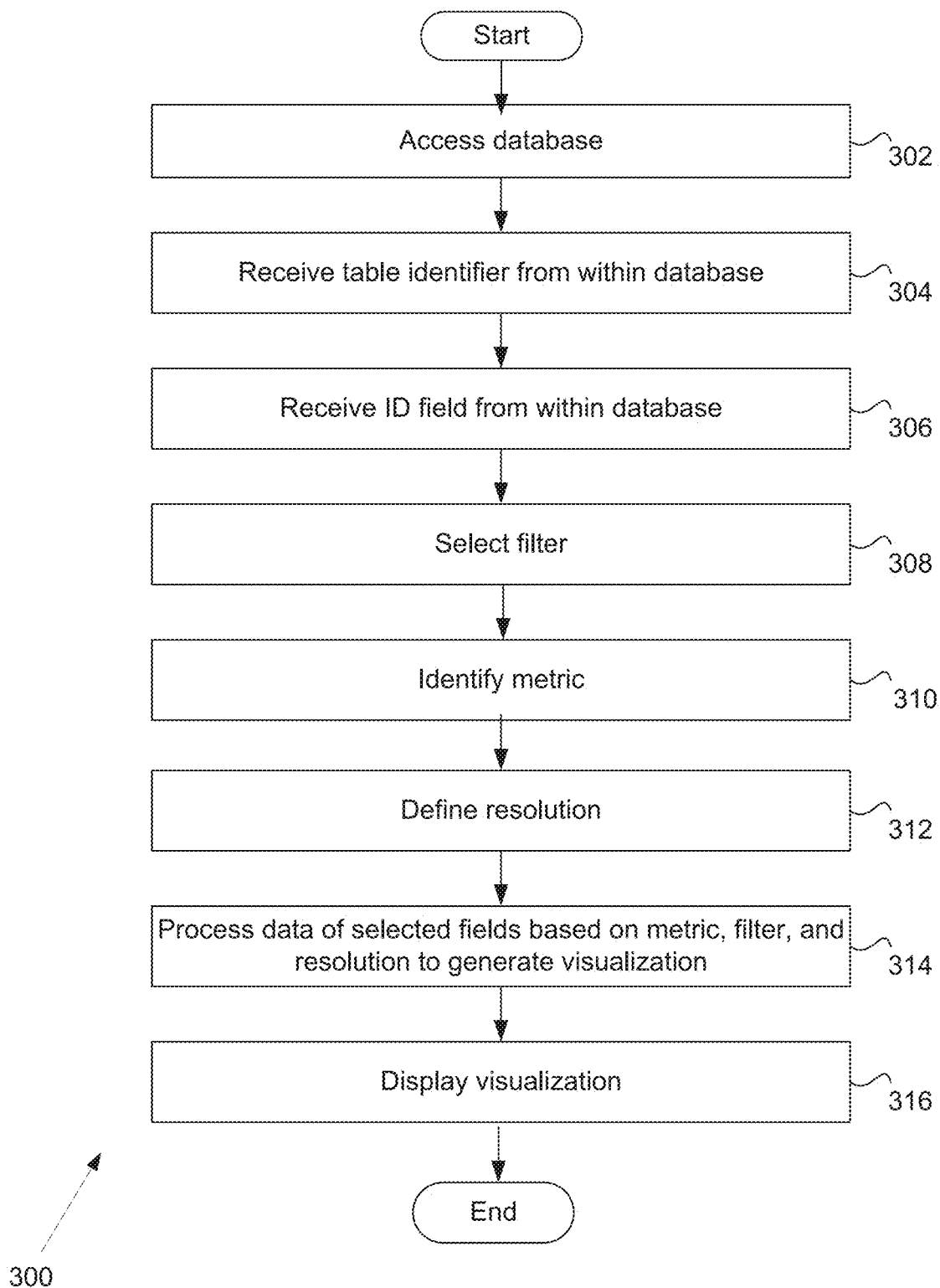
FIG. 3 is a flowchart depicting an exemplary method of dataset analysis and visualization in some embodiments.

FIG. 3 is a flow chart 300 depicting an exemplary method of dataset analysis and visualization in some embodiments. In step 302, the input module 214 accesses a database. The database may be any data structure containing data (e.g., a very large dataset of multidimensional data). In some embodiments, the database may be a relational database. In some examples, the relational database may be used with MySQL, Oracle, Micosoft SQL Server, Aster nCluster, Teradata, and/or Vertica. Those skilled in the art will appreciate that the database may not be a relational database.

In some embodiments, the input module 214 receives a database identifier and a location of the database (e.g., the data storage server 106) from the user device 102a (see FIG. 1). The input module 214 may access the identified database. In various embodiments, the input module 214 may read data from many different sources, including, but not limited to MS Excel files, text files (e.g., delimited or CSV), Matlab .mat format, or any other file.

In some embodiments, the input module 214 receives an IP address or hostname of a server hosting the database, a username, password, and the database identifier. This information (herein referred to as "connection information") may be cached for later use. Those skilled in the art will appreciate that the database may be locally accessed and that all, some, or none of the connection information may be required. In one example, the user device 102a may have full access to the database stored locally on the user device 102a so the IP address is unnecessary. In another example, the user device 102a may already have loaded the database and the input module 214 merely begins by accessing the loaded database.

In various embodiments, the identified database stores data within a matrix or table. The matrix or table may have a "column specification" which stores the names of the columns and their data types. A "row", may be a tuple with one entry for each column of the correct type. In one example, a table to store employee records might have a column specification such as:

employee_id primary key int (this may store the employee's ID as an integer, and uniquely identifies a row)
age int
gender char(1) (gender of the employee may be a single character either M or F)
salary double (salary of an employee may be a floating point number)
name varchar (name of the employee may be a variable-length string)

In this example, each employee corresponds to a row in this table. Further, the example tables in this exemplary relational database are organized into logical units called databases. An analogy to file systems is that databases can be thought of as folders and files as tables. Access to databases may be controlled by the database administrator by assigning a username/password pair to authenticate users.

Once the database is accessed, the input module 214 may allow the user to access a previously stored analysis or to begin a new analysis. If the user begins a new analysis, the input module 214 may provide the user device 102a with an interface window allowing the user to identify a table from within the database. In one example, the input module 214 provides a list of available tables from the identified database.

In step 304, the input module 214 receives a table identifier identifying a table from within the database. The input module 214 may then provide the user with a list of available ID fields from the table identifier. In step 306, the input module 214 receives the ID field identifier from the user and/or user device 102a. The ID field is, in some embodiments, a data key.

Having selected the data key, the input module 214 may generate a new interface window to allow the user to select data fields for analysis. In step 308, the input module 214 receives data field identifiers from the user device 102a. The data within the data fields may be later analyzed by the analysis module 220. In various embodiments, the input module 214 may receive data field identifiers from any source including from the matrix or table, another data storage file, another digital device, or the like.

In step 310, the filter module 216 identifies a metric. In some embodiments, the filter module 216 and/or the input module 214 generates an interface window allowing the user of the user device 102a options for a variety of different metrics and filter preferences. The interface window may be a drop down menu identifying a variety of distance metrics to be used in the analysis. Metric options may include, but are not limited to, Euclidean, DB Metric, variance normalized Euclidean, and total normalized Euclidean. The metric and the analysis are further described herein.

The filter module 216 may select one or more filters. In some embodiments, the user selects and provides filter identifier(s) to the filter module 216. The role of the filters in the analysis is also further described herein. The filters, for example, may be user defined, geometric, or based on data which has been pre-processed. In some embodiments, the data based filters are numerical arrays which can assign a set of real numbers to each row in the table or each point in the data generally.

A variety of geometric filters may be available for the user to choose. Geometric filters may include, but are not limited to:
Density
L1 Eccentricity
L-infinity Eccentricity
Witness based Density
Witness based Eccentricity
Eccentricity as distance from a fixed point
Approximate Kurtosis of the Eccentricity In step 312, the resolution module 218 defines the resolution to be used with a filter in the analysis. The resolution may comprise a number of intervals and an overlap parameter. In various embodiments, the resolution module 218 allows the user to adjust the number of intervals and overlap parameter (e.g., percentage overlap) for one or more filters. In some embodiments, the resolution module 218 may receive a resolution and/or gain from a user (e.g., from a user interface), user device, or digital device.

In step 314, the analysis module 220 processes data of selected fields based on the metric, filter(s), and resolution(s) to generate the visualization.

In step 316, the optional visualization engine 222 optionally displays an interactive visualization. In various embodiments, the visualization may be rendered in two or three dimensional space. The visualization engine 222 may use an optimization algorithm for an objective function which is correlated with good visualization (e.g., the energy of the embedding). The visualization may show a collection of nodes corresponding to each of the partial clusters in the analysis output and edges connecting them as specified by the output.

Although many examples discuss the input module 214 as providing interface windows, those skilled in the art will appreciate that all or some of the interface may be provided by a client on the user device 102a. Further, in some embodiments, the user device 102a may be running all or some of the processing module 212.

Many of the steps and/or structure are further described in U.S. nonprovisional application Ser. No. 13/648,237, entitled "Systems and Methods for Mapping New Patient Information to Historic Outcomes for Treatment Assistance," filed Oct. 9, 2012, which is incorporated by reference herein.

Figure 4:
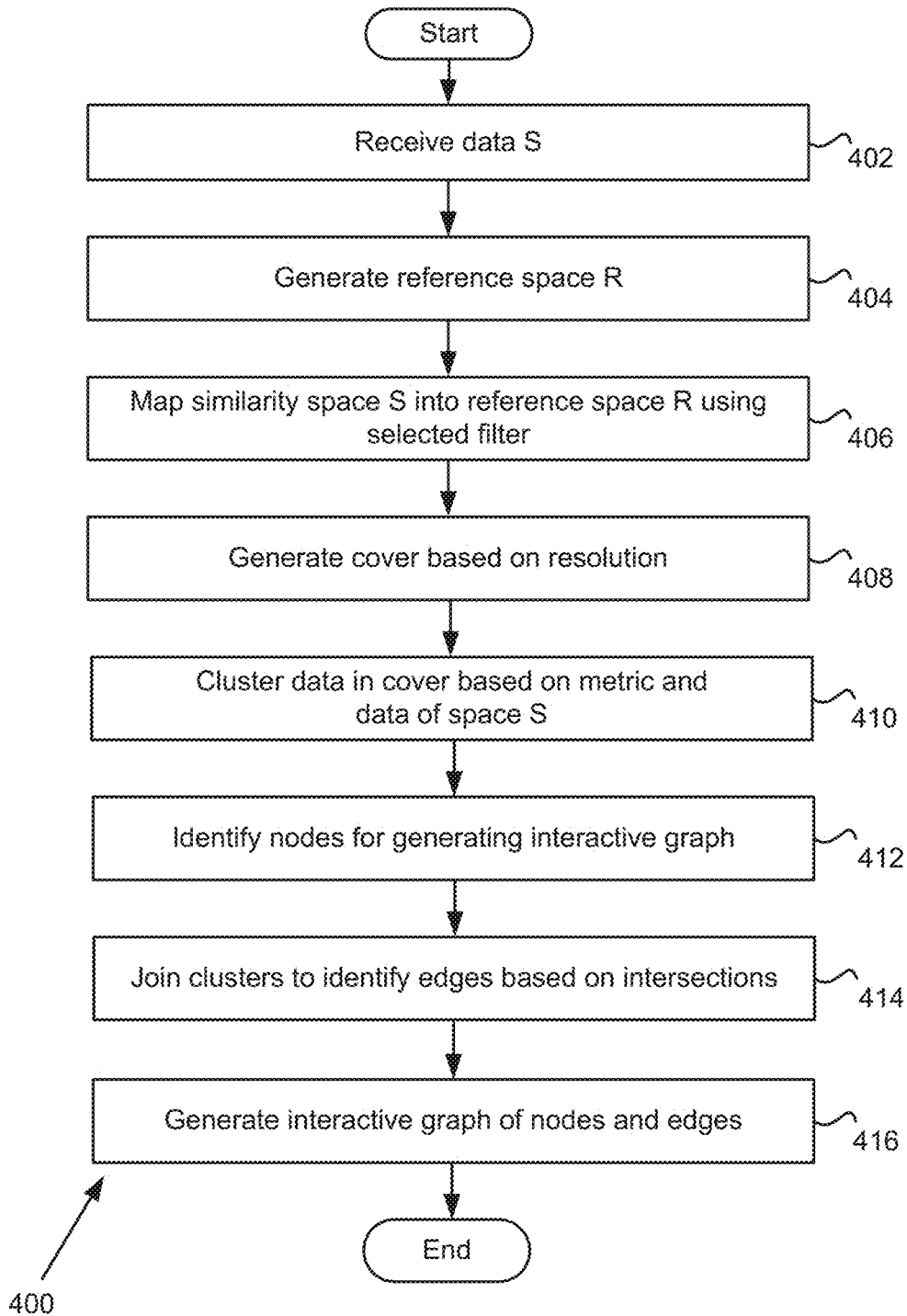
FIG. 4 is a flowchart for data analysis and generating an interactive visualization in some embodiments.

FIG. 4 is a flowchart 400 for data analysis and generating an interactive visualization in some embodiments. In various embodiments, the processing of data and user-specified options is motivated by techniques from topology and, in some embodiments, algebraic topology. These techniques may be robust and general. In one example, these techniques apply to almost any kind of data for which some qualitative idea of "closeness" or "similarity" exists. The techniques discussed herein may be robust because the results may be relatively insensitive to noise in the data, user options, and even to errors in the specific details of the qualitative measure of similarity, which, in some embodiments, may be generally refer to as "the distance function" or "metric." Those skilled in the art will appreciate that while the description of the algorithms below may seem general, the implementation of techniques described herein may apply to any level of generality.

In step 402, the input module 214 receives data S. In one example, a user, another data structure, and/or digital device identifies a data structure and then identifies ID and data fields. Data S may be based on the information within the ID and data fields. In various embodiments, data S is treated as being processed as a finite "similarity space," where data S has a real-valued function d defined on pairs of points s and t in S, such that:

$$d(s,s)=0$$

$$d(s,t)=d(t,s)$$

$$d(s,t)>=0$$

These conditions may be similar to requirements for a finite metric space, but the conditions may be weaker. In various examples, the function is a metric.

Those skilled in the art will appreciate that data S may be a finite metric space, or a generalization thereof, such as a graph or weighted graph. In some embodiments, data S be specified by a formula, an algorithm, or by a distance matrix which specifies explicitly every pairwise distance.

In step 404, the input module 214 generates reference space R. In one example, reference space R may be a well-known metric space (e.g., such as the real line). The reference space R may be defined by the user. In step 406, the analysis module 220 generates a map ref( ) from S into R. The map ref( ) from S into R may be called the "reference map." It will be appreciated that the input module 214 may not generate a reference space but rather may merely map or project data into a reference space R or otherwise utilize a reference space R.

In one example, a reference of map from S is to a reference metric space R. R may be Euclidean space of some dimension, but it may also be the circle, torus, a tree, or other metric space. The map can be described by one or more filters (i.e., real valued functions on S). These filters can be defined by geometric invariants, such as the output of a density estimator, a notion of data depth, or functions specified by the origin of S as arising from a data set.

In step 408, the resolution module 218 generates a cover of R based on the resolution received from the user. The resolution module 218 may receive a resolution from the user (e.g., via a user interface) or may utilize a default cover, for example. The cover of R may be a finite collection of open sets (in the metric of R) such that every point in R lies in at least one of these sets. In various examples, R is k-dimensional Euclidean space, where k is the number of filter functions. More precisely in this example, R is a box in k-dimensional Euclidean space given by the product of the intervals [min_k, max_k], where min_k is the minimum value of the k-th filter function on S, and max_k is the maximum value.

For example, suppose there are 2 filter functions, F1 and F2, and that F1's values range from −1 to +1, and F2's values range from 0 to 5. Then the reference space is the rectangle in the x/y plane with corners (−1,0), (1,0), (−1, 5), (1, 5), as every point s of S will give rise to a pair (F1(s), F2(s)) that lies within that rectangle.

In various embodiments, the cover of R is given by taking products of intervals of the covers of [min_k,max_k] for each of the k filters. In one example, if the user requests 2 intervals and a 50% overlap for F1, the cover of the interval [−1,+1] will be the two intervals (−1.5, 0.5), (−0.5, 1.5). If the user requests 5 intervals and a 30% overlap for F2, then that cover of [0, 5] will be (−0.3, 1.3), (0.7, 2.3), (1.7, 3.3), (2.7, 4.3), (3.7, 5.3). These intervals may give rise to a cover of the 2-dimensional box by taking all possible pairs of intervals where the first of the pair is chosen from the cover for F1 and the second from the cover for F2. This may give rise to 2*5, or 10, open boxes that covered the 2-dimensional reference space. However, those skilled in the art will appreciate that the intervals may not be uniform, or that the covers of a k-dimensional box may not be constructed by products of intervals. In some embodiments, there are many other choices of intervals. Further, in various embodiments, a wide range of covers and/or more general reference spaces may be used.

In one example, given a cover, $C_1, \ldots, C_m$, of R, the reference map is used to assign a set of indices to each point in S, which are the indices of the $C_j$ such that ref(s) belongs to $C_j$. This function may be called ref_tags(s). In a language such as Java, ref_tags would be a method that returned an int[ ]. Since the C's cover R in this example, ref(s) must lie in at least one of them, but the elements of the cover usually overlap one another, which means that points that "land near the edges" may well reside in multiple cover sets. In considering the two filter example, if F1(s) is −0.99, and F2(s) is 0.001, then ref(s) is (−0.99, 0.001), and this lies in the cover element (−1.5, 0.5)×(−0.3,1.3). Supposing that was labeled $C_1$, the reference map may assign s to the set {1}. On the other hand, if t is mapped by F1, F2 to (0.1, 2.1), then ref(t) will be in (−1.5,0.5)×(0.7, 2.3), (−0.5, 1.5)×(0.7, 2.3), (−1.5,0.5)×(1.7,3.3), and (−0.5, 1.5)×(1.7,3.3), so the set of indices would have four elements for t.

Having computed, for each point, which "cover tags" it is assigned to, for each cover element, $C_d$, the points may be constructed, whose tags included, as set S(d). This may mean that every point s is in S(d) for some d, but some points may belong to more than one such set. In some embodiments, there is, however, no requirement that each S(d) is non-empty, and it is frequently the case that some of these sets are empty. In the non-parallelized version of some embodiments, each point x is processed in turn, and x is inserted into a hash-bucket for each j in ref_tags(t) (that is, this may be how S(d) sets are computed).

It will be appreciated that the cover of the reference space R may be controlled by the number of intervals and the overlap identified in the resolution. For example, the more intervals, the finer the resolution in S—that is, the fewer points in each S(d), but the more similar (with respect to the filters) these points may be. The greater the overlap, the more times that clusters in S(d) may intersect clusters in S(e)—this means that more "relationships" between points may appear, but, in some embodiments, the greater the overlap, the more likely that accidental relationships may appear.

In step 410, the analysis module 220 clusters each S(d) based on the metric, filter, and the space S. In some embodiments, a dynamic single-linkage clustering algorithm may be used to partition S(d). Those skilled in the art will appreciate that any number of clustering algorithms may be used with embodiments discussed herein. For example, the clustering scheme may be k-means clustering for some k, single linkage clustering, average linkage clustering, or any method specified by the user.

The significance of the user-specified inputs may now be seen. In some embodiments, a filter may amount to a "forced stretching" in a certain direction. In some embodiments, the analysis module 220 may not cluster two points unless all of the filter values are sufficiently "related" (recall that while normally related may mean "close," the cover may impose a much more general relationship on the filter values, such as relating two points s and t if ref(s) and ref(t) are sufficiently close to the same circle in the plane). In various embodiments, the ability of a user to impose one or more "critical measures" makes this technique more powerful than regular clustering, and the fact that these filters can be anything, is what makes it so general.

The output may be a simplicial complex, from which one can extract its 1-skeleton. The nodes of the complex may be partial clusters, (i.e., clusters constructed from subsets of S specified as the preimages of sets in the given covering of the reference space R).

In step 412, the visualization engine 222 identifies nodes which are associated with a subset of the partition elements of all of the S(d) for optionally generating an interactive visualization. For example, suppose that S={1, 2, 3, 4}, and the cover is $C_1$, $C_2$, $C_3$. Then if ref_tags(1)={1, 2, 3} and ref_tags(2)={2, 3}, and ref_tags(3)={3}, and finally ref_tags(4)={1, 3}, then S(1) in this example is {1, 4}, S(2)={1,2}, and S(3)={1,2,3,4}. If 1 and 2 are close enough to be clustered, and 3 and 4 are, but nothing else, then the clustering for S(1) may be {1} {3}, and for S(2) it may be {1,2}, and for S(3) it may be {1,2}, {3,4}. So the generated graph has, in this example, at most four nodes, given by the sets {1}, {4}, {1,2}, and {3,4} (note that {1,2} appears in two different clusterings). Of the sets of points that are used, two nodes intersect provided that the associated node sets have a non-empty intersection (although this could easily be modified to allow users to require that the intersection is "large enough" either in absolute or relative terms).

Nodes may be eliminated for any number of reasons. For example, a node may be eliminated as having too few points and/or not being connected to anything else. In some embodiments, the criteria for the elimination of nodes (if any) may be under user control or have application-specific requirements imposed on it. For example, if the points are consumers, for instance, clusters with too few people in area codes served by a company could be eliminated. If a cluster was found with "enough" customers, however, this might indicate that expansion into area codes of the other consumers in the cluster could be warranted.

In step 414, the visualization engine 222 joins clusters to identify edges (e.g., connecting lines between nodes). Once the nodes are constructed, the intersections (e.g., edges) may be computed "all at once," by computing, for each point, the set of node sets (not ref_tags, this time). That is, for each s in S, node_id_set(s) may be computed, which is an int[ ]. In some embodiments, if the cover is well behaved, then this operation is linear in the size of the set S, and we then iterate over each pair in node_id_set(s). There may be an edge between two node_id's if they both belong to the same node_id_set( ) value, and the number of points in the intersection is precisely the number of different node_id sets in which that pair is seen. This means that, except for the clustering step (which is often quadratic in the size of the sets S(d), but whose size may be controlled by the choice of cover), all of the other steps in the graph construction algorithm may be linear in the size of S, and may be computed quite efficiently.

Figure 5:
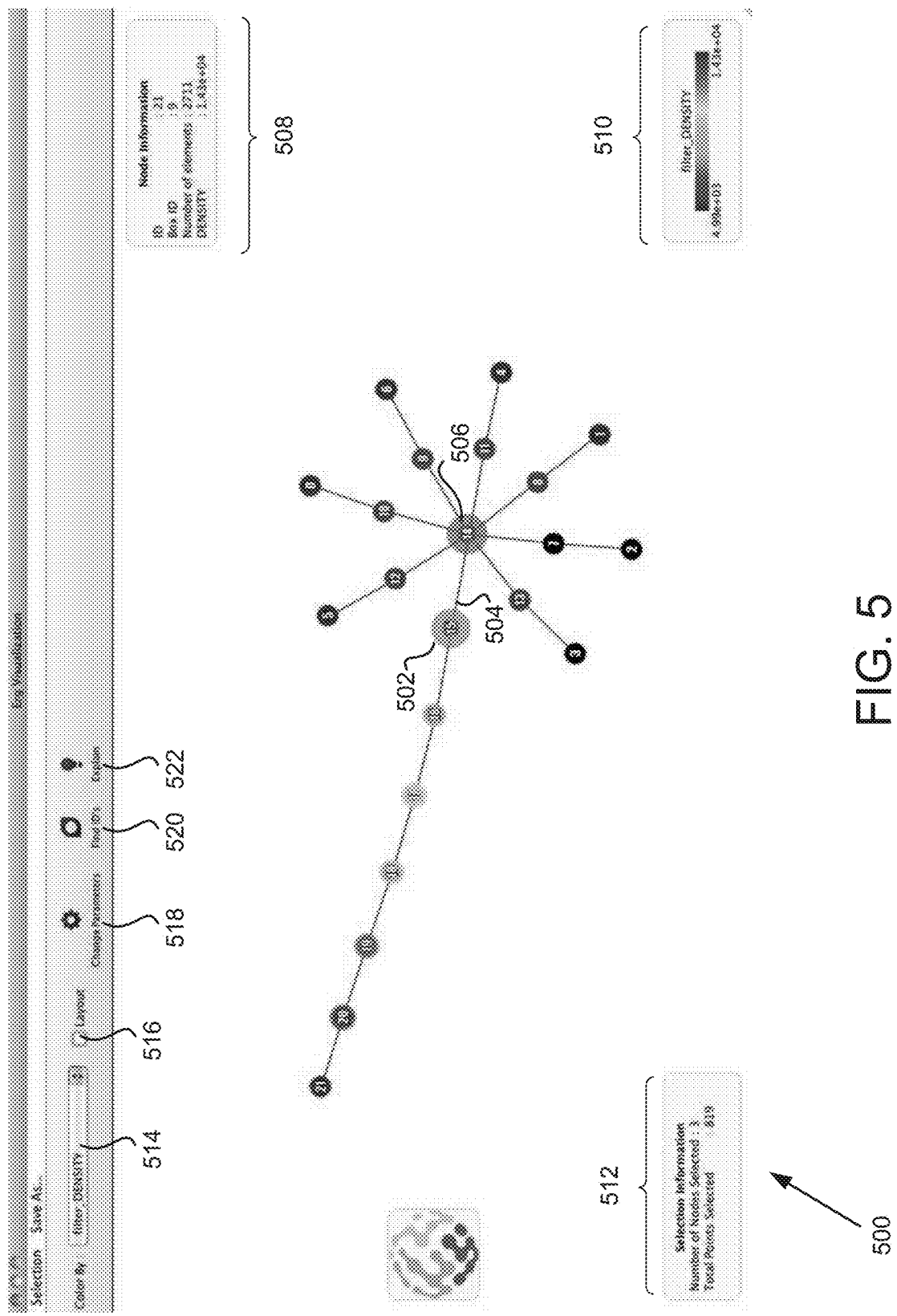
FIG. 5 is an exemplary interactive visualization in some embodiments.
Figure 6:
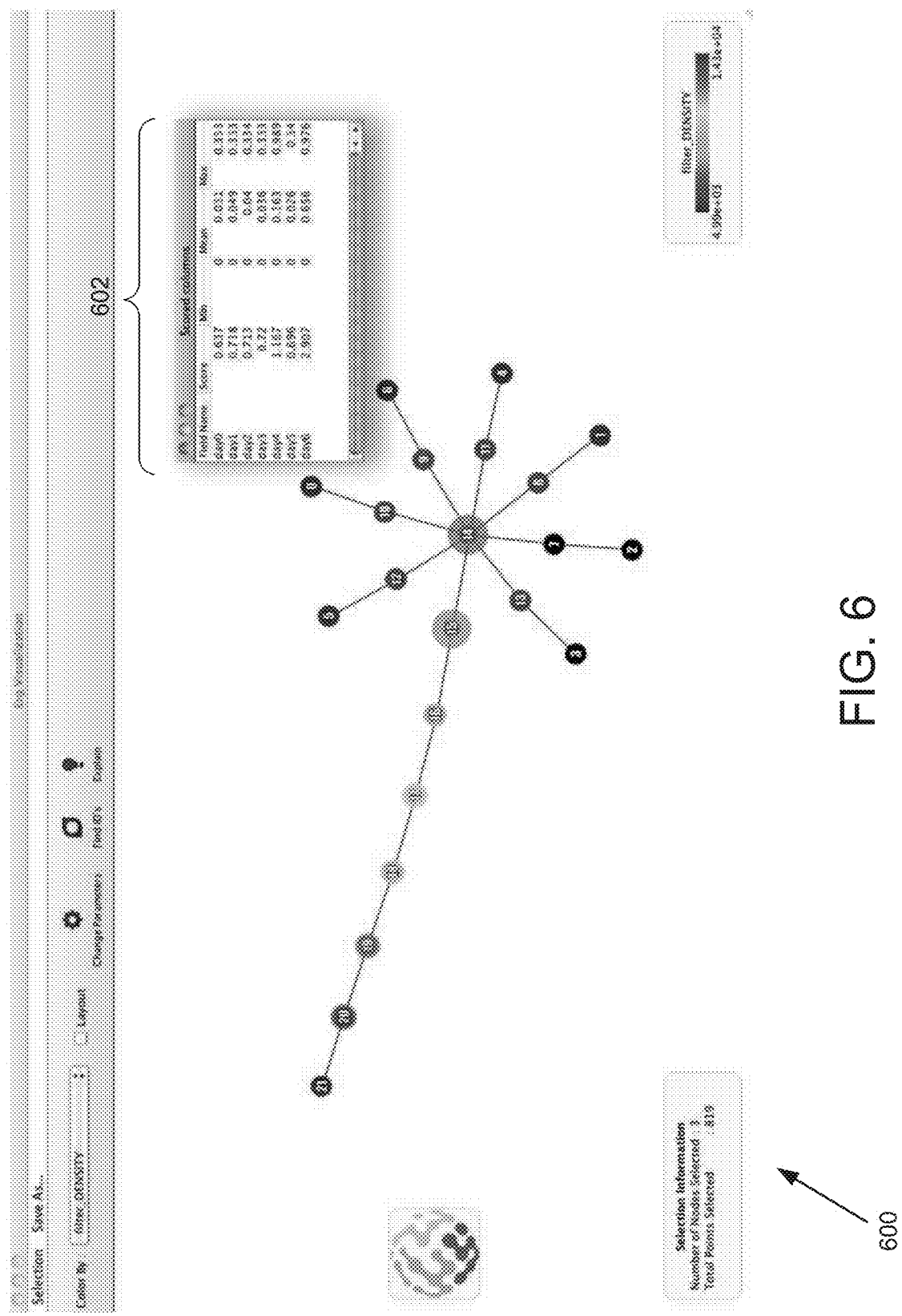
FIG. 6 is an exemplary interactive visualization displaying an explain information window in some embodiments.

In step 416, the visualization engine 222 generates the interactive visualization of interconnected nodes (e.g., nodes and edges displayed in FIGS. 5 and 6). It will be appreciated that the nodes may be defined and/or identified, as well as relationships between nodes without necessarily generating the visualization. For example, the nodes and relationships may be defined in memory and used for any number of applications, analyses, or uses.

It will be appreciated that it is possible, in some embodiments, to make sense in a fairly deep way of connections between various ref( ) maps and/or choices of clustering. Further, in addition to computing edges (pairs of nodes), the embodiments described herein may be extended to compute triples of nodes, etc. For example, the analysis module 220 may compute simplicial complexes of any dimension (by a variety of rules) on nodes, and apply techniques from homology theory to the graphs to help users understand a structure in an automatic (or semi-automatic) way.

Further, those skilled in the art will appreciate that uniform intervals in the covering may not always be a good choice. For example, if the points are exponentially distributed with respect to a given filter, uniform intervals can fail—in such case adaptive interval sizing may yield uniformly-sized S(d) sets, for instance.

Further, in various embodiments, an interface may be used to encode techniques for incorporating third-party extensions to data access and display techniques. Further, an interface may be used to for third-party extensions to underlying infrastructure to allow for new methods for generating coverings, and defining new reference spaces.

In another example directed to health data, a cancer map visualization is generated using genomic data linked to clinical outcomes (i.e., medical characteristics) which may be used by physicians during diagnosis and/or treatment. Initially, publicly available data sets may be integrated to construct the topological map visualizations of patients (e.g., breast cancer patients). It will be appreciated that any private, public, or combination of private and public data sets may be integrated to construct the topological map visualizations. A map visualization may be based on biological data such as, but not limited to, gene expression, sequencing, and copy number variation. As such, the map visualization may comprise many patients with many different types of collected data. Unlike traditional methods of analysis where distinct studies of breast cancer appear as separate entities, the map visualization may fuse disparate data sets while utilizing many datasets and data types.

In various embodiments, a new patient may be localized on the map visualization. With the map visualization for subtypes of a particular disease and a new patient diagnosed with the disease, point(s) may be located among the data points used in computing the map visualization (e.g., nearest neighbor) which is closest to the new patient point. The new patient may be labeled with nodes in the map visualization containing the closest neighbor. These nodes may be highlighted to give a physician the location of the new patient among the patients in the reference data set. The highlighted nodes may also give the physician the location of the new patient relative to annotated disease subtypes.

The visualization map may be interactive and/or searchable in real-time thereby potentially enabling extended analysis and providing speedy insight into treatment.

The following is another example of the flowchart depicted in FIG. 4 using biological and clinical outcome data. In this example, in step 402, biological data and clinical outcomes of previous patients may be received. The clinical outcomes may be medical characteristics. Biological data is any data that may represent a condition (e.g., a medical condition) of a person. Biological data may include any health related, medical, physical, physiological, pharmaceutical data associated with one or more patients. In one example, biological data may include measurements of gene expressions for any number of genes. In another example, biological data may include sequencing information (e.g., RNA sequencing).

Biological data for a plurality of patients may be publicly available. For example, various medical health facilities and/or public entities may provide gene expression data for a variety of patients. In addition to the biological data, information regarding any number of clinical outcomes, treatments, therapies, diagnoses and/or prognoses may also be provided. Those skilled in the art will appreciate that any kind of information may be provided in addition to the biological data.

Figure 8:
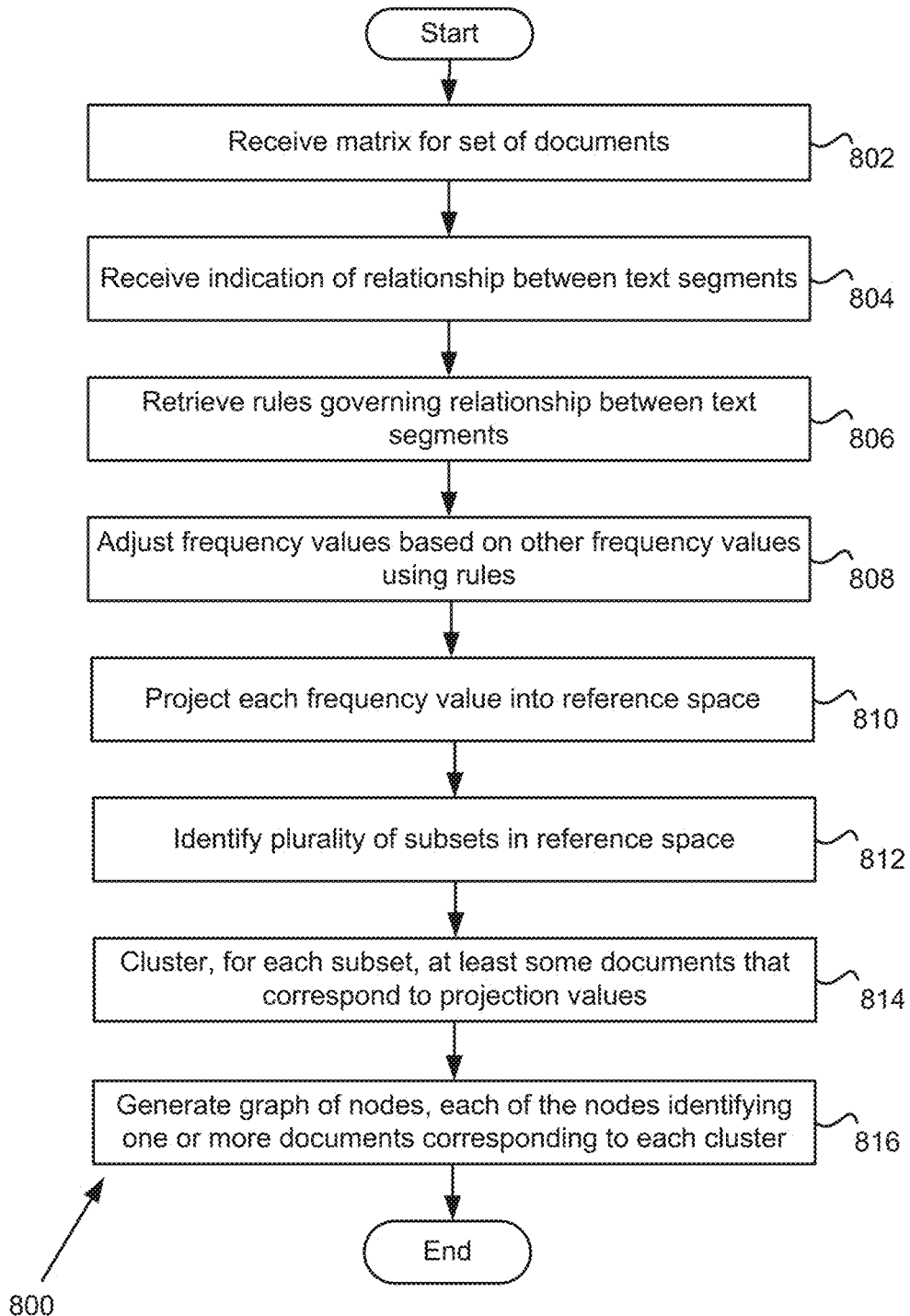
FIG. 8 is a flowchart for smoothing and generation of a graph in some embodiments.

The biological data, in one example, may be similar to data S as discussed with regard to step 802 of FIG. 8. The biological data may include ID fields that identify patients and data fields that are related to the biological information (e.g., gene expression measurements).

Data S may include, for example, biological data for a number of patients. Data S may be used to generate the cancer map visualization in some embodiments. One column, for example, may represent different patient identifiers for different patients. The patient identifiers may be any identifier.

At least some biological data may be contained within gene expression measurements. For example, there may be 50,000 or more separate columns for different gene expressions related to a single patient or related to one or more samples from a patient. Those skilled in the art will appreciate that at least one column may represent a gene expression measurement for each patient (if any for some patients) associated with the patient identifiers. A column may represent a gene expression measurement of one or more genes that are different than that of other columns. As discussed, there may be any number of columns representing different gene expression measurements.

At least one column may, for example, include any number of clinical outcomes, prognoses, diagnoses, reactions, treatments, and/or any other information associated with each patient. All or some of the information contained in any number of columns may be displayed (e.g., by a label or an annotation that is displayed on the visualization or available to the user of the visualization via clicking) on or for the visualization.

Rows may, for example, each contains biological data associated with the patient identifier of the row. For example, gene expressions in an exemplary row may be associated with patient identifier P 1. For example, there may be 100,000 or more separate rows for different patients.

Those skilled in the art will appreciate that there may be any number of data structures that contain any amount of biological data for any number of patients. The data structure(s) may be utilized to generate any number of map visualizations.

In some embodiments, the analysis server 108 may receive a filter selection. In some embodiments, the filter selection is a density estimation function. It will be appreciated that the filter selection may include a selection of one or more functions to generate a reference space.

In step 406, the analysis server 108 performs the selected filter(s) on the biological data of the previous patients to map the biological data into a reference space. In one example, a density estimation function, which is well known in the art, may be performed on the biological data (e.g., data associated with gene expression measurement data) to relate each patient identifier to one or more locations in the reference space (e.g., on a real line).

In step 408, the analysis server 108 may receive a resolution selection. The resolution may be utilized to identify overlapping portions of the reference space (e.g., a cover of the reference space R).

As discussed herein, the cover of R may be a finite collection of open sets (in the metric of R) such that every point in R lies in at least one of these sets. In various examples, R is k-dimensional Euclidean space, where k is the number of filter functions. It will be appreciated that the cover of the reference space R may be controlled by the number of intervals and the overlap identified in the resolution. For example, the more intervals, the finer the resolution in S (e.g., the similarity space of the received biological data)—that is, the fewer points in each S(d), but the more similar (with respect to the filters) these points may be. The greater the overlap, the more times that clusters in S(d) may intersect clusters in S(e)—this means that more "relationships" between points may appear, but, in some embodiments, the greater the overlap, the more likely that accidental relationships may appear.

In step 410, the analysis server 108 receives a metric to cluster the information of the cover in the reference space to partition S(d). In one example, the metric may be a Pearson Correlation. The clusters may form the groupings (e.g., nodes or balls) in step 412. Various cluster means may be used including, but not limited to, a single linkage, average linkage, complete linkage, or k-means method.

As discussed herein, in some embodiments, the analysis server 108 may not cluster two points unless filter values are sufficiently "related" (recall that while normally related may mean "close," the cover may impose a much more general relationship on the filter values, such as relating two points s and t if ref(s) and ref(t) are sufficiently close to the same circle in the plane where ref( ) represents one or more filter functions). The output may be a simplicial complex, from which one can extract its 1-skeleton. The nodes of the complex may be partial clusters, (i.e., clusters constructed from subsets of S specified as the preimages of sets in the given covering of the reference space R).

In step 414, the analysis server 108 may generate or define nodes representing clusters of patient members and edges between nodes representing common patient members. In one example, the analysis server identifies nodes which are associated with a subset of the partition elements of all of the S(d).

As discussed herein, for example, suppose that S={1, 2, 3, 4}, and the cover is $C_1$, $C_2$, $C_3$. Suppose cover $C_1$ contains {1, 4}, $C_2$ contains {1,2}, and $C_3$ contains {1,2,3,4}. If 1 and 2 are close enough to be clustered, and 3 and 4 are, but nothing else, then the clustering for S(1) may be {1}, {4}, and for S(2) it may be {1,2}, and for S(3) it may be {1,2}, {3,4}. So the generated graph has, in this example, at most four nodes, given by the sets {1}, {4}, {1, 2}, and {3, 4} (note that {1, 2} appears in two different clusterings). Of the sets of points that are used, two nodes intersect provided that the associated node sets have a non-empty intersection (although this could easily be modified to allow users to require that the intersection is "large enough" either in absolute or relative terms).

As a result of clustering, member patients of a grouping may share biological similarities (e.g., similarities based on the biological data).

The analysis server 108 may join clusters to identify edges (e.g., connecting lines between nodes). Clusters joined by edges (i.e., interconnections) share one or more member patients.

In step 416, a display may display a visualization map with attributes based on the clinical outcomes contained in the data structures. Any labels or annotations may be utilized based on information contained in the data structures. For example, treatments, prognoses, therapies, diagnoses, and the like may be used to label the visualization. In some embodiments, the physician or other user of the map visualization accesses the annotations or labels by interacting with the map visualization.

The resulting cancer map visualization may reveal interactions and relationships that were obscured, untested, and/or previously not recognized.

FIG. 5 is an exemplary interactive visualization 500 in some embodiments. The display of the interactive visualization may be considered a "graph" in the mathematical sense. The interactive visualization comprises of two types of objects: nodes (e.g., nodes 502 and 506) (the colored balls) and the edges (e.g., edge 504) (the black lines). The edges connect pairs of nodes (e.g., edge 504 connects node 502 with node 506). As discussed herein, each node may represent a collection of data points (rows in the database identified by the user). In one example, connected nodes tend to include data points which are "similar to" (e.g., clustered with) each other. The collection of data points may be referred to as being "in the node." The interactive visualization may be two-dimensional, three-dimensional, or a combination of both.

In various embodiments, connected nodes and edges may form a graph or structure. There may be multiple graphs in the interactive visualization. In one example, the interactive visualization may display two or more unconnected structures of nodes and edges.

The visual properties of the nodes and edges (such as, but not limited to, color, stroke color, text, texture, shape, coordinates of the nodes on the screen) can encode any data based property of the data points within each node. For example, coloring of the nodes and/or the edges may indicate (but is not limited to) the following:

Values of fields or filters

Any general functions of the data in the nodes (e.g., if the data were unemployment rates by state, then GDP of the states may be identifiable by color the nodes)

Number of data points in the node

The interactive visualization 500 may contain a "color bar" 510 which may comprise a legend indicating the coloring of the nodes (e.g., balls) and may also identify what the colors indicate. For example, in FIG. 5, color bar 510 indicates that color is based on the density filter with blue (on the far left of the color bar 510) indicating "4.99e+03" and red (on the far right of the color bar 510) indicating "1.43e+04." In general this might be expanded to show any other legend by which nodes and/or edges are colored. It will be appreciated that the, in some embodiments, the user may control the color as well as what the color (and/or stroke color, text, texture, shape, coordinates of the nodes on the screen) indicates.

The user may also drag and drop objects of the interactive visualization 500. In various embodiments, the user may reorient structures of nodes and edges by dragging one or more nodes to another portion of the interactive visualization (e.g., a window). In one example, the user may select node 502, hold node 502, and drag the node across the window. The node 502 will follow the user's cursor, dragging the structure of edges and/or nodes either directly or indirectly connected to the node 502. In some embodiments, the interactive visualization 500 may depict multiple unconnected structures. Each structure may include nodes, however, none of the nodes of either structure are connected to each other. If the user selects and drags a node of the first structure, only the first structure will be reoriented with respect to the user action. The other structure will remain unchanged. The user may wish to reorient the structure in order to view nodes, select nodes, and/or better understand the relationships of the underlying data.

In one example, a user may drag a node to reorient the interactive visualization (e.g., reorient the structure of nodes and edges). While the user selects and/or drags the node, the nodes of the structure associated with the selected node may move apart from each other in order to provide greater visibility. Once the user lets go (e.g., deselects or drops the node that was dragged), the nodes of the structure may continue to move apart from each other.

In various embodiments, once the visualization engine 222 generates the interactive display, the depicted structures may move by spreading out the nodes from each other. In one example, the nodes spread from each other slowly allowing the user to view nodes distinguish from each other as well as the edges. In some embodiments, the visualization engine 222 optimizes the spread of the nodes for the user's view. In one example, the structure(s) stop moving once an optimal view has been reached.

It will be appreciated that the interactive visualization 500 may respond to gestures (e.g., multitouch), stylus, or other interactions allowing the user to reorient nodes and edges and/or interacting with the underlying data.

The interactive visualization 500 may also respond to user actions such as when the user drags, clicks, or hovers a mouse cursor over a node. In some embodiments, when the user selects a node or edge, node information or edge information may be displayed. In one example, when a node is selected (e.g., clicked on by a user with a mouse or a mouse cursor hovers over the node), a node information box 508 may appear that indicates information regarding the selected node. In this example, the node information box 508 indicates an ID, box ID, number of elements (e.g., data points associated with the node), and density of the data associated with the node.

The user may also select multiple nodes and/or edges by clicking separate on each object, or drawing a shape (such as a box) around the desired objects. Once the objects are selected, a selection information box 512 may display some information regarding the selection. For example, selection information box 512 indicates the number of nodes selected and the total points (e.g., data points or elements) of the selected nodes.

The interactive visualization 500 may also allow a user to further interact with the display. Color option 514 allows the user to display different information based on color of the objects. Color option 514 in FIG. 5 is set to filter Density, however, other filters may be chosen and the objects re-colored based on the selection. Those skilled in the art will appreciate that the objects may be colored based on any filter, property of data, or characterization. When a new option is chosen in the color option 514, the information and/or colors depicted in the color bar 510 may be updated to reflect the change.

Layout checkbox 514 may allow the user to anchor the interactive visualization 500. In one example, the layout checkbox 514 is checked indicating that the interactive visualization 500 is anchored. As a result, the user will not be able to select and drag the node and/or related structure. Although other functions may still be available, the layout checkbox 514 may help the user keep from accidentally moving and/or reorienting nodes, edges, and/or related structures. Those skilled in the art will appreciate that the layout checkbox 514 may indicate that the interactive visualization 500 is anchored when the layout checkbox 514 is unchecked and that when the layout checkbox 514 is checked the interactive visualization 500 is no longer anchored.

The change parameters button 518 may allow a user to change the parameters (e.g., add/remove filters and/or change the resolution of one or more filters). In one example, when the change parameters button 518 is activated, the user may be directed back to the metric and filter selection interface window which allows the user to add or remove filters (or change the metric). The user may then view the filter parameter interface and change parameters (e.g., intervals and overlap) for one or more filters. The analysis node 220 may then re-analyze the data based on the changes and display a new interactive visualization 500 without again having to specify the data sets, filters, etc.

The find ID's button 520 may allow a user to search for data within the interactive visualization 500. In one example, the user may click the find ID's button 520 and receive a window allowing the user to identify data or identify a range of data. Data may be identified by ID or searching for the data based on properties of data and/or metadata. If data is found and selected, the interactive visualization 500 may highlight the nodes associated with the selected data. For example, selecting a single row or collection of rows of a database or spreadsheet may produce a highlighting of nodes whose corresponding partial cluster contains any element of that selection.

In various embodiments, the user may select one or more objects and click on the explain button 522 to receive in-depth information regarding the selection. In some embodiments, when the user selects the explain button 522, the information about the data from which the selection is based may be displayed.

In various embodiments, the interactive visualization 500 may allow the user to specify and identify subsets of interest, such as output filtering, to remove clusters or connections which are too small or otherwise uninteresting. Further, the interactive visualization 500 may provide more general coloring and display techniques, including, for example, allowing a user to highlight nodes based on a user-specified predicate, and coloring the nodes based on the intensity of user-specified weighting functions.

The interactive visualization 500 may comprise any number of menu items. The "Selection" menu may allow the following functions:
  Select singletons (select nodes which are not connected to other nodes)
  Select all (selects all the nodes and edges)
  Select all nodes (selects all nodes)
  Select all edges
  Clear selection (no selection)
  Invert Selection (selects the complementary set of nodes or edges)
  Select "small" nodes (allows the user to threshold nodes based on how many points they have)
  Select leaves (selects all nodes which are connected to long "chains" in the graph)
  Remove selected nodes
  Show in a table (shows the selected nodes and their associated data in a table)
  Save selected nodes (saves the selected data to whatever format the user chooses. This may allow the user to subset the data and create new datasources which may be used for further analysis.)

In one example of the "show in a table" option, information from a selection of nodes may be displayed. The information may be specific to the origin of the data. In various embodiments, elements of a database table may be listed, however, other methods specified by the user may also be included. For example, in the case of microarray data from gene expression data, heat maps may be used to view the results of the selections.

The interactive visualization 500 may comprise any number of menu items. The "Save" menu may allow may allow the user to save the whole output in a variety of different formats such as (but not limited to):
  Image files (PNG/JPG/PDF/SVG etc.)
  Binary output (The interactive output is saved in the binary format. The user may reopen this file at any time to get this interactive window again)
In some embodiments, graphs may be saved in a format such that the graphs may be used for presentations. This may include simply saving the image as a pdf or png file, but it may also mean saving an executable .xml file, which may permit other users to use the search and save capability to the database on the file without having to recreate the analysis.

In various embodiments, a relationship between a first and a second analysis output/interactive visualization for differing values of the interval length and overlap percentage may be displayed. The formal relationship between the first and second analysis output/interactive visualization may be that when one cover refines the next, there is a map of simplicial complexes from the output of the first to the output of the second. This can be displayed by applying a restricted form of a three-dimensional graph embedding algorithm, in which a graph is the union of the graphs for the various parameter values and in which the connections are the connections in the individual graphs as well as connections from one node to its image in the following graph. The constituent graphs may be placed in its own plane in 3D space. In some embodiments, there is a restriction that each constituent graph remain within its associated plane. Each constituent graph may be displayed individually, but a small change of parameter value may result in the visualization of the adjacent constituent graph. In some embodiments, nodes in the initial graph will move to nodes in the next graph, in a readily visualizable way.

FIG. 6 is an exemplary interactive visualization 600 displaying an explain information window 602 in some embodiments. In various embodiments, the user may select a plurality of nodes and click on the explain button. When the explain button is clicked, the explain information window 602 may be generated. The explain information window 602 may identify the data associated with the selected object(s) as well as information (e.g., statistical information) associated with the data.

In some embodiments, the explain button allows the user to get a sense for which fields within the selected data fields are responsible for "similarity" of data in the selected nodes and the differentiating characteristics. There can be many ways of scoring the data fields. The explain information window 602 is shown along with the selected nodes. The highest scoring fields may distinguish variables with respect to the rest of the data.

In one example, the explain information window 602 indicates that data from fields day0-day6 has been selected. The minimum value of the data in all of the fields is 0. The explain information window 602 also indicates the maximum values. For example, the maximum value of all of the data associated with the day( ) field across all of the points of the selected nodes is 0.353. The average (i.e., mean) of all of the data associated with the day( ) field across all of the points of the selected nodes is 0.031. The score may be a relative (e.g., normalized) value indicating the relative function of the filter; here, the score may indicate the relative density of the data associated with the day( ) field across all of the points of the selected nodes. Those skilled in the art will appreciate that any information regarding the data and/or selected nodes may appear in the explain information window 602.

It will be appreciated that the data and the interactive visualization 600 may be interacted with in any number of ways. The user may interact with the data directly to see where the graph corresponds to the data, make changes to the analysis and view the changes in the graph, modify the graph and view changes to the data, or perform any kind of interaction.

Figure 7:
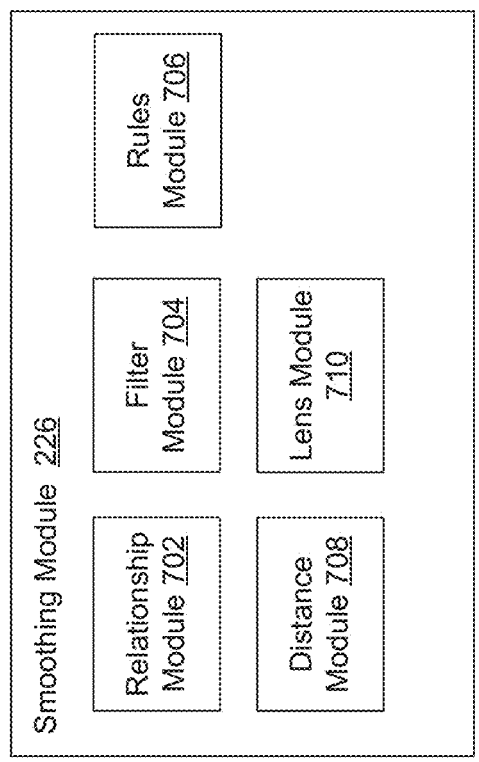
FIG. 7 depicts a smoothing module in some embodiments.

FIG. 7 depicts a smoothing module 226 in some embodiments. The smoothing module 226 may, in some embodiments, modify data within the matrix (e.g., data S). In some embodiments, the smoothing module 226 does not modify data but rather generates new data based on portions (e.g., related columns). In one example, the smoothing module 226 may generate a column of new data based on the contents of two or more other columns. Analysis may be performed on all data (including the new data from the smoothed module 226) or only some of the data (e.g., the new data from the smoothed module 226 and only some of the data utilized by the smoothing module 226 to generate the new data). In one simple example, the smoothed module 226 may generate data for new column X based on columns 1 and 2 which are related. Analysis may be conducted on all three columns, columns X and 1, or columns X and 2.

In various embodiments, the smoothing module 226 includes a relationship module 702, a filter module 704, a rules module 706, a distance module 708, and/or a lens module 710. The smoothing module 226 may include any or all of these modules.

The relationship module 702 may receive or identify relationships within data (e.g., data S). For example, the relationship module 702 may receive relationship information that identifies relationships within the data (e.g., between two or more columns within the data S) from any source(s). In some embodiments, the relationship module 702 may identify relationships within the data based on a function (e.g., a distance function) and may determine to smooth data based on any, some, or all of the relationships. For example, if the distance between two data points is too small, the relationship module 702 may not smooth (e.g., perform a smoothing function on) the two data points. If the distance between the two data points is greater than a predetermined threshold, however, in some embodiments, the relationship module 702 may smooth the data points (e.g., either by modifying one of the data points or adding an additional column to the data S with the modified data).

The filter module 704 may filter (e.g., remove or preprocess) the data S before or after the relationship module 702 smooths all or some of the data. The rules module 706 may include rules for the relationship module 702. In various embodiments, the relationship module 702 and/or the filter module 704 may retrieve rules that indicate the relationships within the data and/or any preprocessing needed (as discussed herein). In some embodiments, the rules module 706 includes rules for how to adjust data or add new data based on content of data S as also described herein.

The distance module 708 may be configured to generate a distance function utilized by the relationship module 702. In some embodiments, the distance module 708 generates a distance function or utilizes a distance function based on the smooth function (e.g., the function used to smooth the data which may be performed by the relationship module 702). The lens module 710 may be configured to generate a lens function utilized by the relationship module 702. The lens module 710 may generate the lens function or utilizes the lens function based on the smooth function (e.g., the function used to smooth the data which may be performed by the relationship module 702). Examples of distance functions and lens functions are discussed herein.

A fundamental problem in data analysis is that of studying data which is a sense "unstructured," or rather structured differently from standard formats. One example is that of corpora of unstructured text. Such corpora clearly contain very important information (e.g., collections of e-mails, large families of documents in legal discovery proceedings, newspaper articles over a period of time, patents, and the like), but do not immediately fit into the datamatrix model.

In fact, it may not be obvious how to assign notions of distance reflecting the similarity of documents within a corpus.

In various embodiments, Latent Semantic Analysis (LSA) is utilized in processing or preprocessing data (e.g., the input module 214 may perform LSA) to assign notions of distance reflecting similarity of documents. In one example, LSA constructs a data matrix based on a corpus of documents, in which each document is a data point, or row in the matrix. Since some exemplary methods for studying such text corpora takes LSA as a starting point, we will briefly describe it here.

For example, a corpus C of documents $D_i$, may be viewed as a list of words in a dictionary. A matrix M may be constructed whose rows correspond to the documents of corpus C, and whose columns are the words $W_j$ in the dictionary. The (i,j)-th entry in the matrix M is now the count of the number of occurrences of the word $W_j$ in the document $D_i$. This is an initial construction of a matrix, based on viewing the documents as "bags of words" since the ordering of the words in the document does not play a role in the matrix construction. This is already a data matrix with the documents are regarded as data points.

The matrix M may include term frequency-inverse document frequency (tf-idf), in which columns corresponding to infrequently occurring (in the corpus) words are weighted (e.g., up-weighted). For example, the frequency of the word in a document may be divided by the frequency within the corpus. Algorithmic column renormalization may be more common. The term frequency (i.e, the "tf" term) may be modified. For example, tf may be modified by taking 1+ln ($M_{ij}$). This normalization may be utilized when the co-occurrence of infrequently occurring words in distinct documents are to be viewed as stronger evidence for the similarity of the documents. For example, to take an extreme situation, the co-occurrence of the word "the" should have relatively little significance in the similarity of documents, even though its absolute occurrence rate in all documents is relatively high.

In some embodiments, the LSA process may proceed by applying the similar value decomposition to the matrix. For example, the singular value decomposition may proceed by applying right and left multiplication of a given matrix by orthogonal matrices, until the matrix has the form:

$$\begin{bmatrix} D & 0 \\ 0 & 0 \end{bmatrix}$$

Where D is a diagonal matrix:

$$\begin{matrix} d_1 & 0 & \ldots & 0 \\ 0 & d_2 & \ldots & 0 \\ \vdots & \vdots & \ddots & \vdots \\ 0 & 0 & \ldots & d_n \end{matrix}$$

where the $D_i$'s are in decreasing order.

The projection of the data points onto the subspace corresponding to the highest singular values may give a useful method of dimensionality reduction to the data, and may be found to give interesting insights into the structure of the corpus.

In some embodiments, in addition to or instead of the application of similar value decomposition, TDA may be utilized to analyze the data matrix used by the LSA method. In one example, the distance module 708 may construct distance functions based on the original tf-idf matrix, which are suitable for use in the construction of the TDA networks. These metrics may be constructed in such a way as to be scalable to very large corpora. The lens module 710 may compute lenses may be computed for the construction of the networks. Some of these may be based on the geometry alone, and provide an "unsupervised" view of the corpus. Lenses may be constructed based on J. Kleinberg's "hubs and authorities" weight constructions. For supervised analysis, semantic lenses may be constructed. Semantic lenses may be based on collections of words corresponding to particular concepts or themes, such as "romance," "crime," or "adventure."

The relationship module 702 may perform data smoothing techniques utilizing using, for example, synonymous words and/or an external thesaurus (e.g., retrieved by the rules module 706). In standard LSA, the presence of the word "law" in one document and the word "regulation" in another does not contribute to similarity, but it is often desirable that it should. This can be done through a version of "smoothing" the metric, which is described herein.

Given a data matrix, with the data points corresponding to the rows and the columns corresponding to the fields, distance may be assigned to the rows from the matrix, but the fields may not studied. In one example, a Euclidean distance function may be assigned to the column vectors, but what sometimes occurs is that the columns are already equipped with an external notion of distance from an external source. For example, if one were tracking objects using physical sensors, the geographic placement of the sensors would yield a metric on the space of sensors. If one is studying a data matrix coming from such sensors, one would want to use this distance to study the dataset perhaps to denoise it.

In the LSA situation, words occurring in the corpus may be treated as "sensors" for the documents. Now we can establish that there is a natural external notion of distance on the words, derived from curated lists of words such as dictionaries. For example, Roget's Thesaurus provides short lists of words related to a more general topic word. One can link any word occurring in such a list to the topic word to form a network of words, and therefore a notion of distance on the word set using the edge-path length metric on this network. Furthermore, there are natural language techniques (e.g., word2vec) which can also be used to build corpus-specific a thesaurus to use for smoothing.

One way to make use of this distance is as follows. Suppose we have decreasing function φ on the real numbers. The relationship module 702 may use a rapidly decreasing φ. The relationship module 702 may regard the "response" on each sensor as a function on the data set (i.e., the rows). Assuming continuity of the responses as a function of the sensors, we try to smooth the data matrix by the following procedure: If we let C, be the i-th column, then the relationship module 702 may construct the i-th column of the smoothed datamatrix $\hat{M}$ by the formula (e.g., smoothing function):

$$\hat{C}_i = \sum_j \varphi(d(C_i, C_j)) C_j$$

Note that $d(C_i, C_j)$ denotes the externally defined distance between the i-th and j-th sensors. The function φ is rapidly decreasing, so the effect on $\hat{C}_i$ of columns $C_j$ which are far from $C_i$ is very small, but nearby $C_j$'s have a more noticeable effect. In the case of geographically defined sensors as above, this may perform a weighted sum of a sensor and its nearby sensors, which may have a smoothing effect. In the case of text corpora, this may mean that smoothing may be occur by performing a weighted sum of the word counts associated to words with similar meanings, as documented by the thesaurus.

FIG. 8 is a flowchart for smoothing and generation of a graph in some embodiments. In this example, we describe the metric used on the space of books, how smoothing may be implemented, and semantic lenses (including hubs and authorities lenses). In step 802, the processing module 212 (e.g., input module 214) receives a matrix (e.g., data S) for a set of documents. In various embodiments, the processing module 212 may generate a matrix based on any or all of a set of documents are, alternately, the processing module 212 may receive a preexisting matrix.

In one example, the matrix may be generated based on a corpus of 29,469 English text documents downloaded from the Project Gutenberg. Some of these "documents" are quite long (dictionaries or encyclopedias), and some very short (the Gettysburg Address). There are multiple editions of some books, and the texts range from documents that are entered by hand to those that were scanned with optical character recognition (OCR) software. In this example, the preamble and postscript to the documents, when present and identifiable, were stripped from the text before processing, but the texts themselves are not especially consistent, so there is more "noise" in these documents than would be the case in a professionally curated corpus. It will be appreciated that any or all documents may be further altered or not altered.

In this example, all words in the documents were put in the lower-case, rather than try to include positional cues to determine if a word was a proper noun. Clearly, having a different (e.g. more sophisticated) text parser could give even sharper results, but we were interested in seeing how far we could push this exemplary method with the simple example parser. It will be appreciated that any parser may be used.

An example of a smoothing technique that may be utilized by the smoothing module 226 utilizing distance on the columns of the text corpus is described. We chose to use the WordNet database (e.g., from the rules module 706) to build such a distance in this example. WordNet is a large lexical database of English nouns, verbs, adjectives, and adverbs, grouped into sets of cognitive synonyms (synsets), each expressing a distinct concept. Synsets are interlinked by means of conceptual-semantic and lexical relations. This database defines a graph structure on words by means of the various linguistic connections between synsets (e.g., hyponyms, antonyms, and troponyms). Further, as WordNet uses only "root" forms (that is, it excludes variants formed by appending "ing," or possessives), it was desirable to add such words to the graph, as they appeared frequently in the corpus in this example. It will be appreciated that any number of lexical databases or the like may be used.

For this example, the WordNet database was parsed, and a weighted graph (directed or undirected, under the control of arguments to the parser) was constructed. The results were not terribly sensitive to choice of edge lengths. In this example, the length from a word is chosen to its plural to be 0.001, from a word to one obtained by removing hyphens or possessives to be 0.01, and from a word to the downcased version 0.05. Further, in this example, the length from words to another within a given synonym set is 0.1, and between a word in one synset and a word in another synset associated by the "ISA" relation was 0.5 (it would be possible to do something much more nuanced with the results of something like word2vec).

Finally, we also added other "word variants" using a modified version of the Porter Stemmer, and applying it to the set of all words seen by the parser. If stemming operations yielded seen words, connections between the "before" and "after" words were added to the word-graph, with weights that depended on the operation (e.g., as mentioned above, "de-pluralizing" resulted in a very short edge between two words). The Porter Stemmer breaks up into 6 natural levels, which can be thought of as {plurals, y<->i, suffixes, -full/-ness, -ant/-ence, -e}. The respective values for these links we used were {0.001, 0.01, 0.5, 0.6, 0.6, 0.6}.

Having constructed a weighted graph of a few-hundred-thousand of the words seen in the corpus, we then defined the distance between two words to be the path-length of the shortest path in the graph.

In this example, the metric for term-frequency (i.e., was selected to be $1+\ln(M_{ij})$, where M is the word-count matrix described herein regarding the LSA. If the total number of documents is N, and for word $w_j$ the number of documents in which the word appears at least once is $d_{w_j}$, then the inverse-document-frequency term (i.e., idf) is equal to $\ln(N/d_{w_j})$.

We chose to use as our metric the similarity score described in this example. Intuitively, we constructed a matrix T whose entries are the tf×idf entries, and then normalized the rows in that matrix by dividing each entry by the Euclidean norm for its row. The rows in this exemplary new matrix, which is called G (for Gutenberg), may be considered to be points on the unit sphere in a somewhat more than five-million-dimensional space (although only about a half-million of the columns have more than a few non-zero entries). The rows of G correspond to the Gutenberg documents, and the arc-length in the high-dimensional sphere corresponds to the distance between two documents.

In step 804, the smoothing module 226 receives an indication of relationship between text segments and in step 806, the smoothing module 226 retrieves rules governing relationship between text segments. It will be appreciated that, in some embodiments, the smoothing module 226 may identify different columns of a matrix as being related. For example, a thesaurus may be utilized (e.g., from the rules module 706) to identify related words (e.g., crimson and red). The smoothing module 226 may determine (or receive) a relationship between two columns of a matrix associated with related words, respectively. The rules module 706 may further provide a smoothing function to apply to the related columns (or any related portions or subsets of the matrix). It will be appreciated that different smoothing functions may be applied to different related portions (e.g., different portions may include different rows, different columns, or a combination or different rows and different columns) of the same matrix. Different smoothing functions may depend upon the data, the type of relationship between portions of the same matrix, and/or a rules function.

Initially, in this example, the smoothing module 226 received a $\varphi(x)$ function. The one we chose was $2/(1+e^{x^2})$, where we also added a hard-cutoff. That is, if two words are greater than some specified cutoff from one another in the graph, the relationship module 702 will not combine those two columns. This was a short enough distance that it allowed one level of "synonym-linkage," and possessives, plurals, and other simple transformations of a word. A different set of edge weighting rules would require a different cutoff Unfortunately, experiments indicate that it appeared that this technique over-weighted the connection between two columns when the words appeared a number of times, and on reflection the problem was fairly obvious. Linear combinations of values that were normalized with the natural logarithm function may not be a natural fit.

Further processing was performed. In this example, the relationship module 702 smoothed the matrix M to make a matrix $\hat{M}$ throwing out any entries that appeared with weight less than 1), and then used that to build $\hat{M}$ in an exact analog of going from M to G.

In some embodiments, the lens module 710 may utilize smoothing in the construction of lenses (e.g., semantic lenses) utilized to project the data (e.g., all or some of the frequency values including the smoothed values) into the reference space in step 810. For example, the hubs and authorities lenses, and those built from word lists. In both cases, the formalism may be the same. In some embodiments, the smoothing module 226 comprises a lens module 710 configured to compute a set of weights $W_j$, on the columns labeled with words $w_j$, and then for a row i in M, the lens weight $F_i$ for the i-th document is defined to be:

$$F_i = (\Sigma_j M_{ij} \times W_j)/(\Sigma_j M_{ij})$$

That is, the lens module 710 sums the product of the weights of each word times the word counts in the document, and divides by the total number of words in the document. For the hubs lens, the lens module 710 computes the "hubs eigenvector" for the directed WordNetgraph described above as described by Kleinberg, and use that for our word-weights. Similarly the "authorities eigenvector" is used for the authorities lens.

For the various word-list based lenses (such as adventure, romance, and crime), we made a list of words that seemed representative of a particular genre, and then used the smoothing mechanism described above to construct a set of word weights. For instance, the crime lens started with the words "mystery," "murder," "police," "judge," "execution," "theft," "prison," "conviction," "arrest," "trial," "lawyer," "assault," "robbery," "fraud," "detective," "conspiracy," "plot," "mastermind," "lurking," "villain," "underhanded," "miscreant," and "betrayal."

As discussed herein, the smoothing module 226 may generate new data (e.g., adding additional columns and/or rows to a matrix) based on the function(s) and/or may replace existing columns.

In step 812, the analysis server 108 may receive a resolution selection (e.g., from a user or another digital device) and identify a plurality of subsets in the reference space. As described regarding FIG. 4, the resolution may be utilized to identify overlapping portions of the reference space (e.g., a cover of the reference space).

As discussed herein, the cover may be a finite collection of open sets (in the metric) such that every point in the reference space lies in at least one of these sets. It will be appreciated that the cover of the reference space may be controlled by the number of intervals and the overlap identified in the resolution.

In step 814, the analysis server 108 receives a metric to cluster the information of the cover in the reference space. Various cluster means may be used including, but not limited to, a single linkage, average linkage, complete linkage, or k-means method.

As discussed herein, in some embodiments, the analysis module 220 may not cluster two points unless filter values are sufficiently "related" (recall that while normally related may mean "close," the cover may impose a much more general relationship on the filter values, such as relating two points s and t if ref(s) and ref(t) are sufficiently close to the same circle in the plane where ref( ) represents one or more filter functions). The output may be a simplicial complex, from which one can extract its 1-skeleton. The nodes of the complex may be partial clusters, (i.e., clusters constructed from subsets of S specified as the preimages of sets in the given covering of the reference space).

The analysis server 108 may generate the visualization map with nodes representing clusters of patient members and edges between nodes representing common patient members. In one example, the analysis server identifies nodes which are associated with a subset of the partition elements of all of the S(d) for generating an interactive visualization.

The following are examples include differences in the graphs for the Gutenberg space using unsmoothed and smoothed metrics. As expected, the unsmoothed metric is tuned to precise word usage and thus more likely to clustering an author's works together, whereas in the smoothed case, due to the effect of the induced thesaurus network, it clusters more on thematic patterns.

Various systems and embodiments may utilize smoothing as described herein in text analysis and text searching as discussed by U.S. nonprovisional application Ser. No. 14/481,546, entitled "Automated Discovery Using Textual Analysis," filed Sep. 9, 2014, which is hereby incorporated by reference herein.

Figures 9A, 9B:
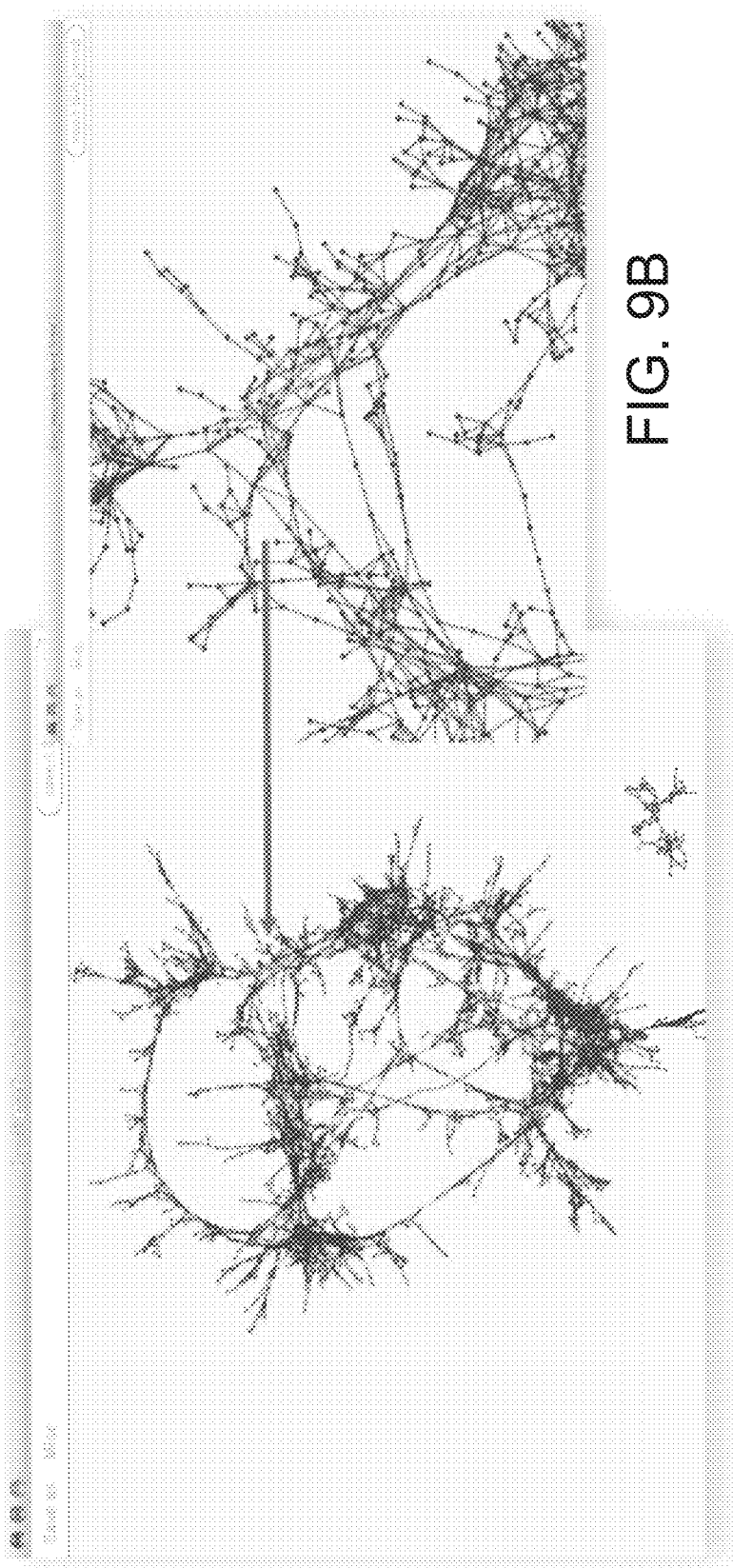
FIG. 9A depicts a graph generated from romance and art lenses on the unsmoothed Gutenberg data set.
FIG. 9B depicts an enlarged region of a portion of the graph of FIG. 9A.

FIG. 9A depicts a graph generated from romance and art lenses on the unsmoothed Gutenberg data set. FIG. 9B depicts an enlarged region of a portion of the graph of FIG. 9A. In FIG. 9A, we see the graph generated from the romance and art lenses on the unsmoothed Gutenberg data set. The enlarged region is predominantly the result of a search for the author Louisa May Alcott. The enlarged region is the principal collection of nodes in which her books are found. To recreate this example, "romance lens" and "art lens" for the Gutenberg space using parameters of 25 intervals, uniformize, and 50 overlap is chosen.

Figure 10:
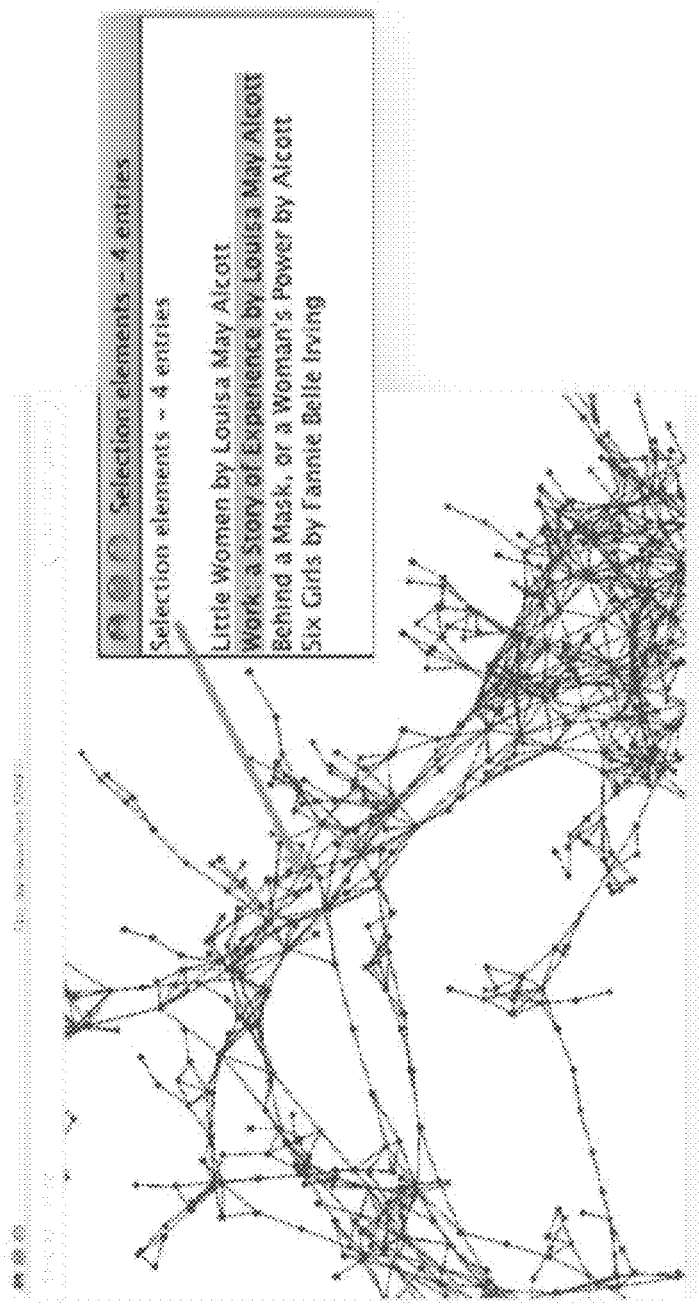
FIG. 10 depicts the unsmoothed graph generated from romance and art lenses, including a selected node with a label indicating that the node is associated with texts by Louisa May Alcott.

FIG. 10 depicts the unsmoothed graph generated from romance and art lenses, including a selected node with a label indicating that the node is associated with texts by Louisa May Alcott. The three books identified by the label are by Alcott and are very different in theme and tone. The other book in the node, "Six Girls," by Fannie Belle Irving, is a juvenile fiction book for young girls, that has been compared to Little Women. The graph from the unsmoothed Gutenberg data seems to capture writing style—sentence length, word usage, and the like. The tone of books by a given author can be quite different from each other. Consider these three books by Louisa May Alcott, for instance. Little Women is a book of juvenile fiction geared towards young girls. Work is a novel with similar morality themes to Little Women, but intended for an older audience. Finally, "Behind a Mask, or A Woman's Power," is from Alcott's initial literary output—gothic thrillers originally published under a pseudonym, and very distinct from the rest of her body of work. Stylistically, however, these three books reveal the continuity of Alcott's writing across differing forms.

Figures 11A, 11B:
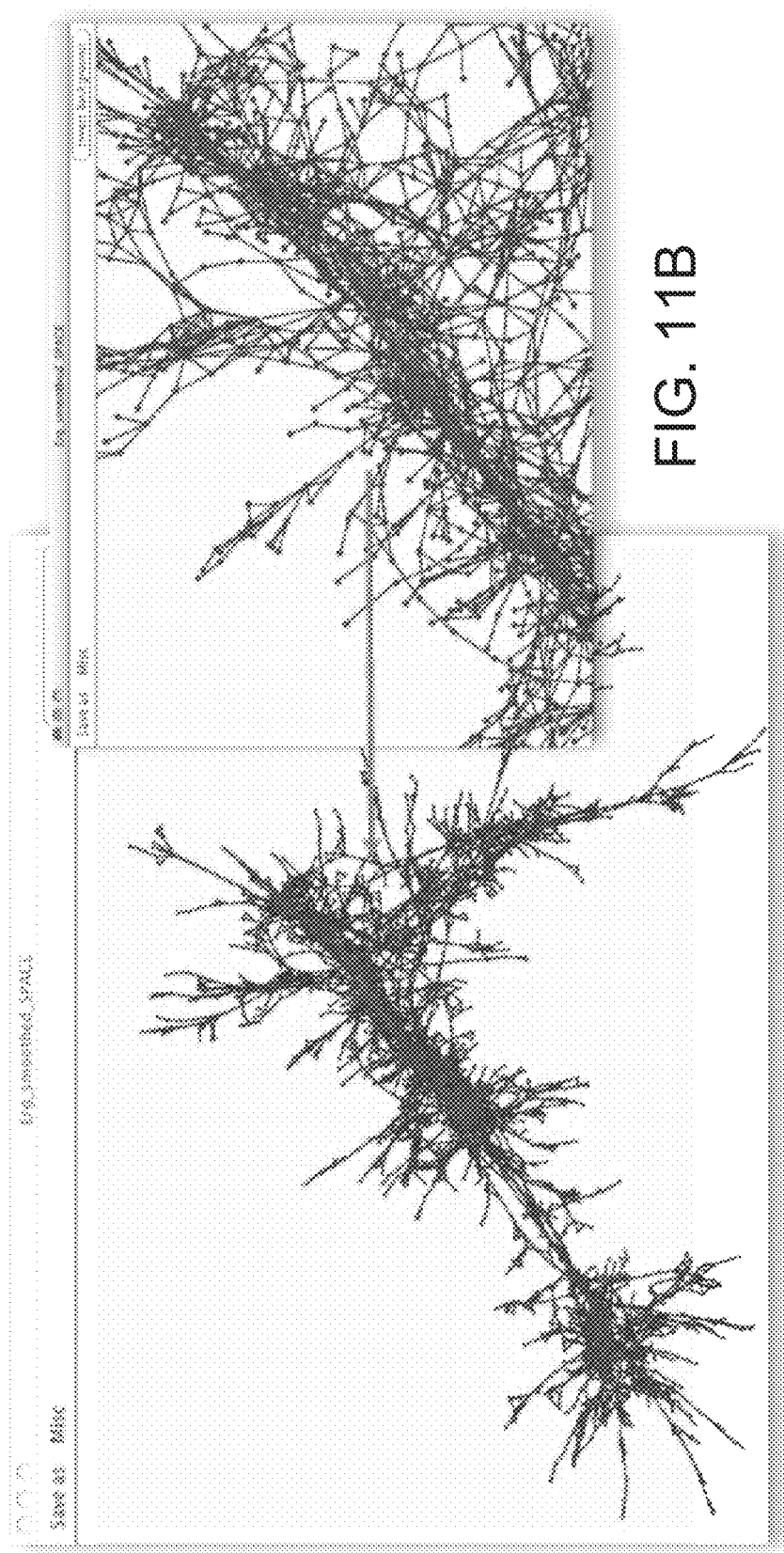
FIG. 11A depicts a graph generated from romance and art lenses on the smoothed Gutenberg data set.
FIG. 11B depicts an enlarged region of a portion of the graph of FIG. 11A.

In contrast, the graph generated from the smoothed Gutenberg data set reveals significantly different structure. FIG. 11A depicts a graph generated from romance and art lenses on the smoothed Gutenberg data set. FIG. 11B depicts an enlarged region of a portion of the graph of FIG. 11A. In FIG. 11A, again focused by a search for Louisa May Alcott, we see that Alcott is not as co-located in FIGS. 9A-B.

Figure 12:
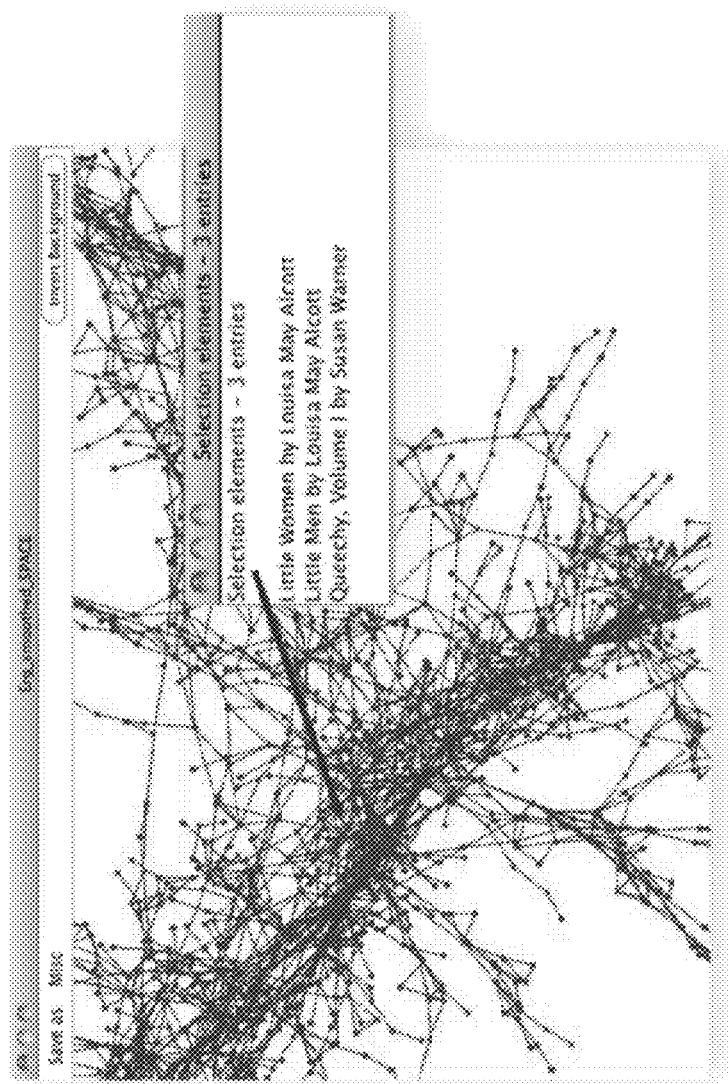
FIG. 12 depicts a book cluster in the smoothed metric by theme and tone instead of by technicalities of writing style.

When we search for the three works of Alcott that were clustered together in the unsmoothed graph, FIG. 12 depicts a book cluster in the smoothed metric by theme and tone instead of by technicalities of writing style. For example, Little Women exists in a cluster that contains only 3 documents. Warner was an American author of the same period as Alcott, who wrote books for children and religious fiction. Additionally, a character in the book Queechy, Miss Plumfield, shares a name with a principal location in the Little Women/Little Men geography, Plumfield Manor.

Figure 13:
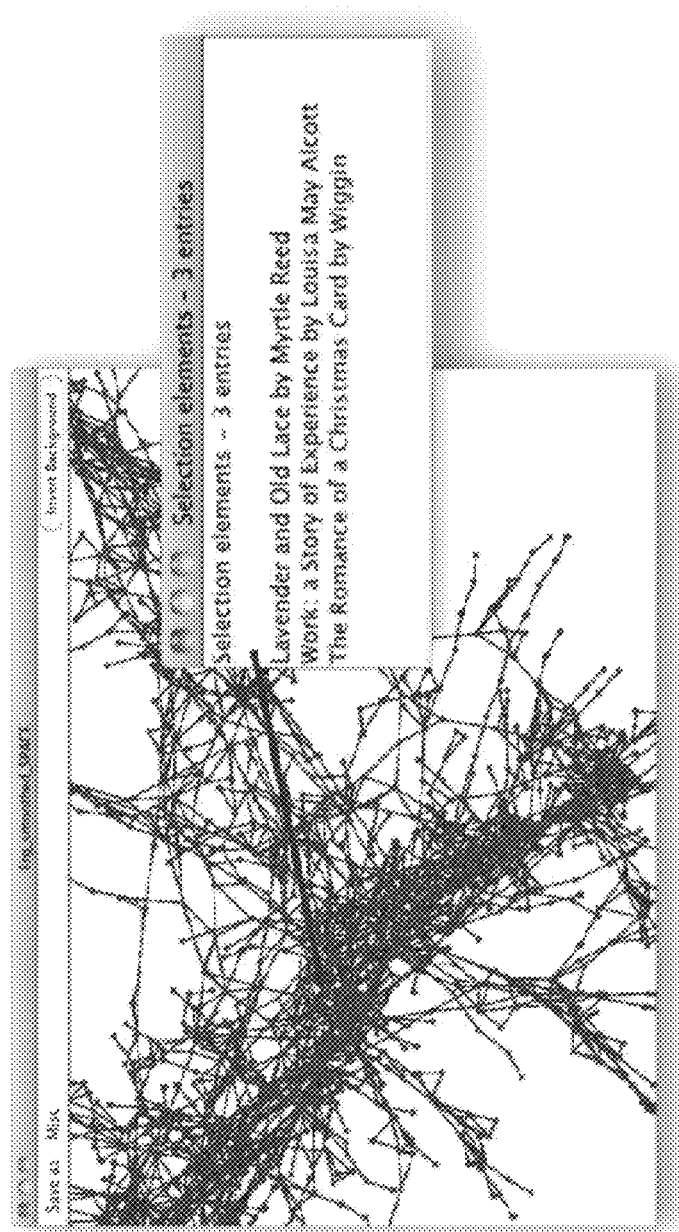
FIG. 13 depicts a graph including a cluster containing three documents in response to a search of the smoothed Gutenberg graph for "Work: A Story of Experience."
Figure 14:
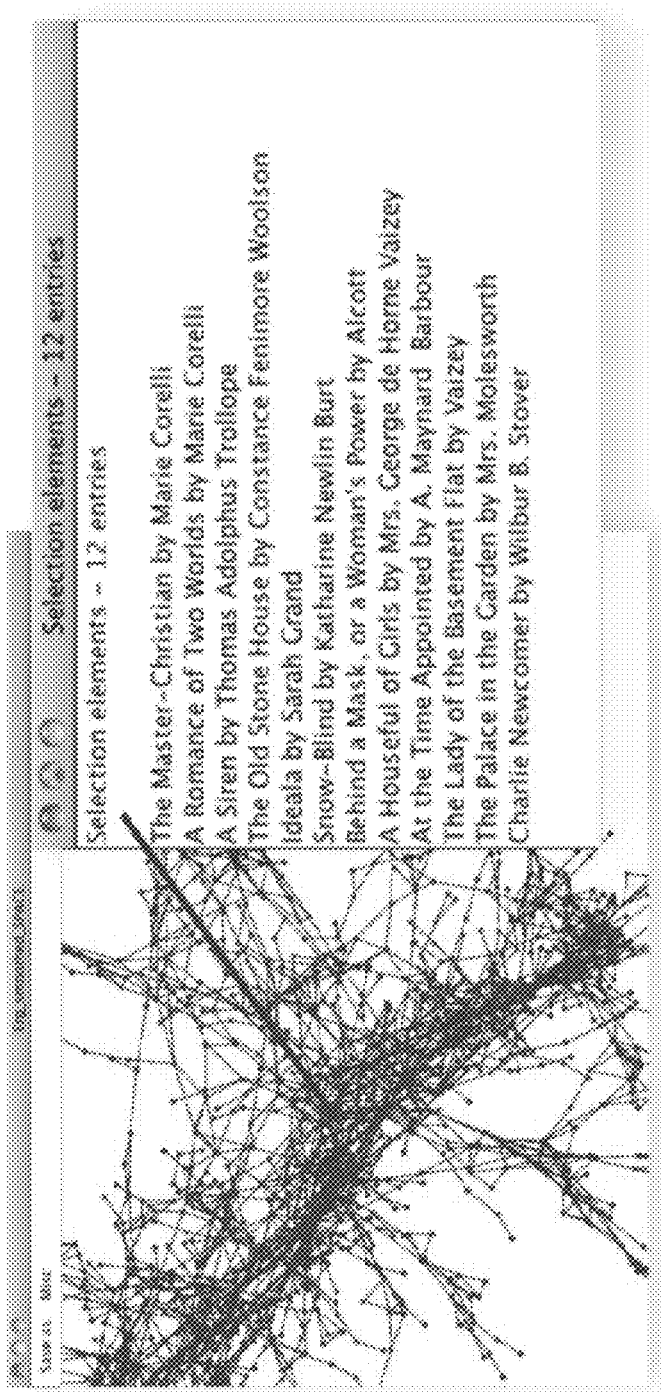
FIG. 14 depicts the smoothed graph including a selected node with a label indicating a list of documents clustered with "Behind a Mask, or A Woman's Power."

FIG. 13 depicts a graph including a cluster containing three documents in response to a search of the smoothed Gutenberg graph for "Work: A Story of Experience." Recall that "Work" is a novel with similar morality themes as Little Women, but intended for an older audience. Similarly, "Lavender and Old Lace" is a romance novel written for women. "The Romance of a Christmas Card" is a story by the same author as "Rebecca of Sunnybrook Farm," a well-known novel for young girls, but dealing with more adult themes. However, like Work: A Story of Experience, and unlike Alcott's gothic novels, the protagonists in these stories are honest and follow "good moral code" for that time period FIG. 14 depicts a graph as a result of a search for the gothic novel in the Alcott cluster in the unsmoothed graph, namely, "Behind a Mask, or A Woman's Power." We see a collection of dramatic novels neither intended for young readers, nor recognized as morality tales, or even particularly lasting pieces of literature. Thus, it is no surprise that Marie Corelli, who was criticized for overly melodramatic writing, was clustered in this group. FIG. 14 depicts the smoothed graph including a selected node with a label indicating a list of documents clustered with "Behind a Mask, or A Woman's Power."

Lenses elucidate different aspects of a data set. For this example, we created two new types of lenses ones that work particularly well for the Gutenberg corpus.

Figures 15A, 15B:
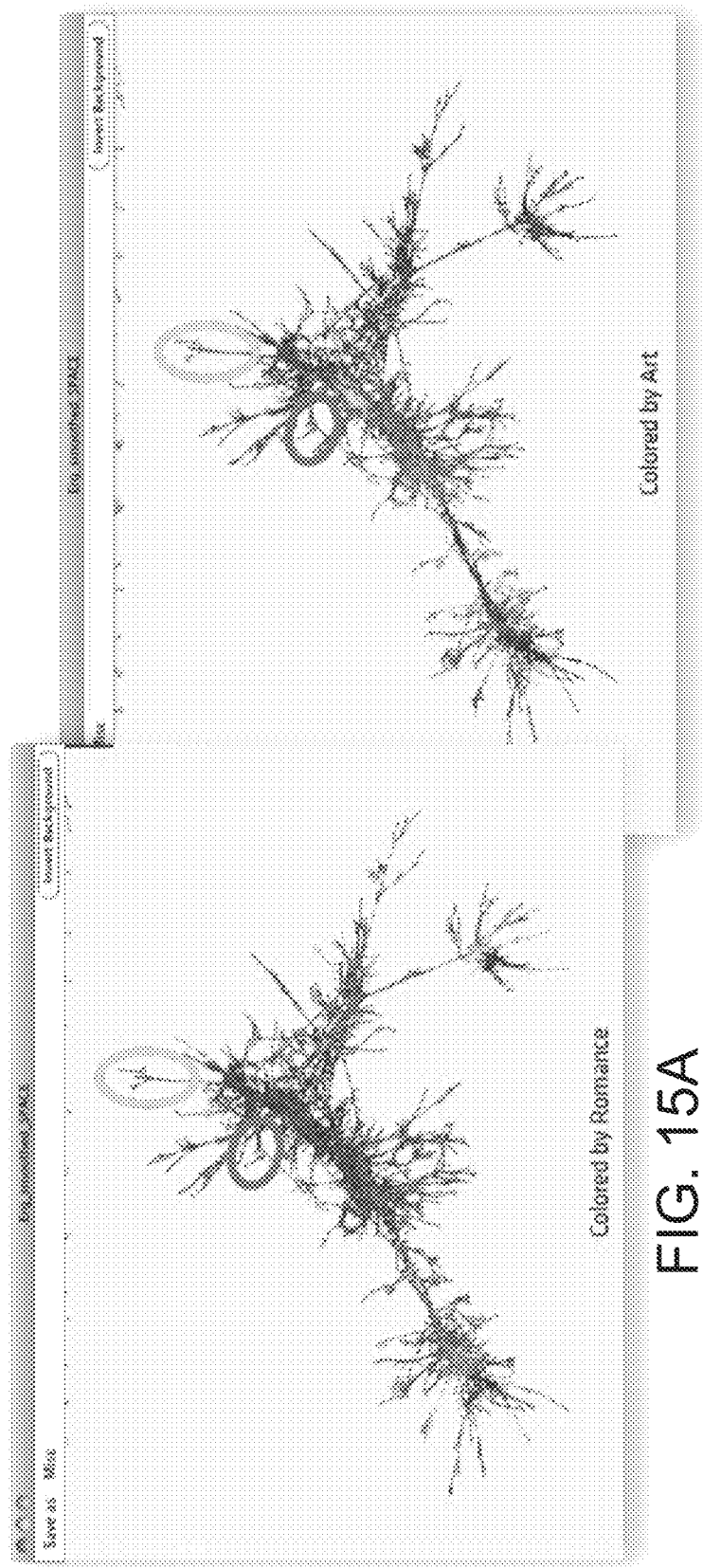
FIG. 15A depicts the smoothed graph using the romance semantic lens.
FIG. 15B is the smoothed graph using the semantic lens.

Semantic lenses, of the type discussed herein, may illustrate the effect of semantic lenses on clustering texts of similar genre. FIGS. 15A and 15B depicts a smoothed graph of the Gutenberg matrix using the romance and art semantic lenses. FIG. 15A depicts the smoothed graph using the romance semantic lens and the FIG. 15B is the smoothed graph using the semantic lens.

Investigation of clusters reveals documents of similar genre. For instance, notice the flare at the top of FIG. 15A may indicate a high usage of art terms and the same flare at the top of FIG. 15B may indicate only moderate usage of romance words (e.g., different portion of the graph may be colored differently based on any number of lenses). The documents in this flare consist of sermons and religious writings such as "Common Sense by Thomas Paine," "The World's Great Sermons, Volume 1," and "In Tune with the Infinite or, Fullness of Peace, Power, and Plenty."

Similarly, the lower flare may indicate heavy usage of romance language while moderate use of art terms. This flare contains Shakespeare's historical dramas such as "King Henry VI" and "King Richard III" together with "The Parish Register by George Crabbe" and poetry by John Keats.

Figure 16:
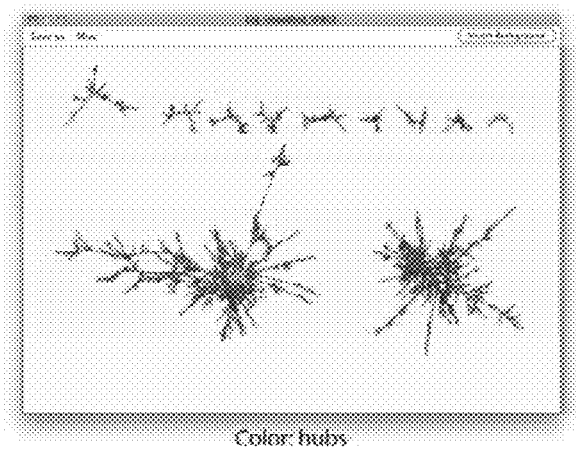
FIG. 16 depicts a graph of the Gutenberg space constructed from the hubs and authorities lenses.
Figure 16:
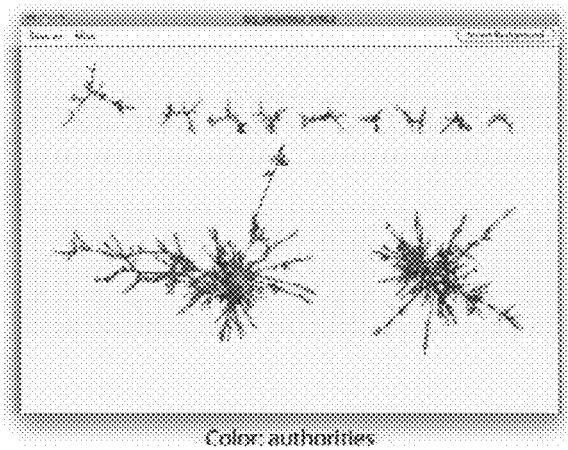
Figure 16:
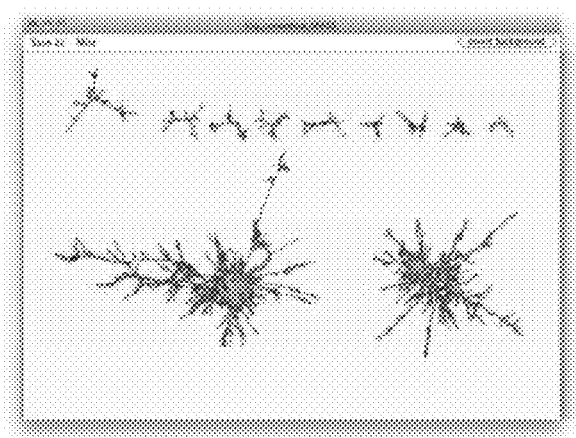
Figure 16:
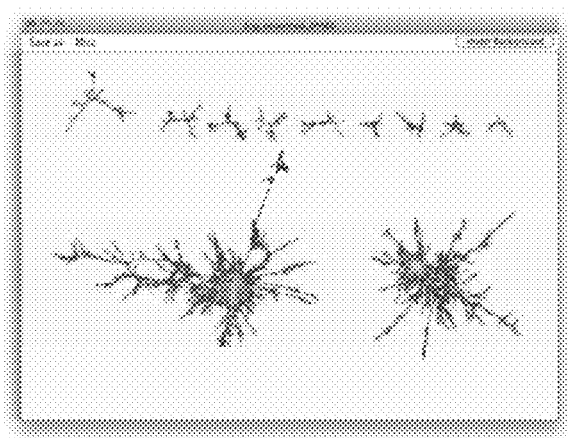
Figure 16:
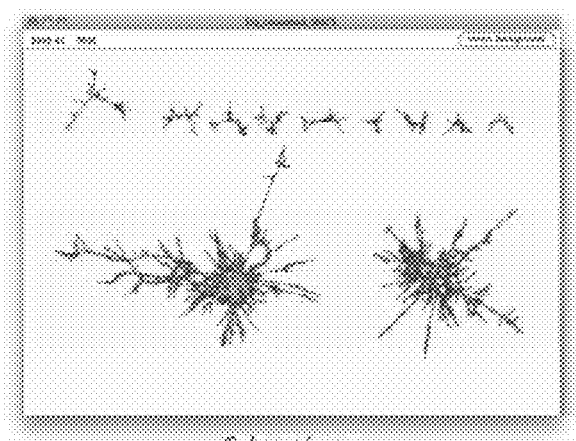
Figure 16:
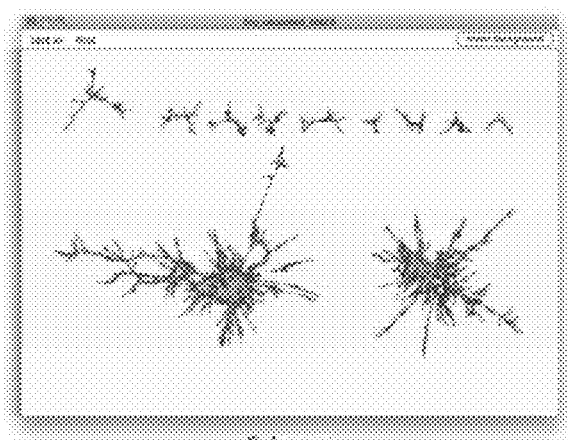

FIG. 16 depicts a graph of the Gutenberg space constructed from the hubs and authorities lenses. The hubs and authorities lenses are the hubs and authorities scores (see\url http://en.wikipedia.org/wiki/Hubs_and_authorities) for the directed graph of the hyponym links in the WordNet thesaurus. In "normal linguistic usage," scarlet, vermilion, carmine, and crimson are all hyponyms of red—their hypernym—which is, in turn, a hyponym of color. The geometry of this graph in FIG. 16 is quite different from that in the previous examples in the size and complexity of the flares on each of the connected components.

In each of these frames in FIG. 16, the graph may be colored by a different semantic lens. For example, red may indicate high vocabulary match to that particular lens, whereas blue may indicate a low vocabulary match. There are color differences that may change in lens choice. Documents that have high values for a particular semantic lens, such as "art," may contain many words that are similar to a seed set of word chosen to describe art. These documents may get, for example, warmer (redder) color values in the displayed graph to represent the high value for the lens-generated color scheme. Documents high in science and art may be high in both the hubs and authorities values while those documents that are high in comedy and history may be low in the hubs and authorities scores.

Figure 17:
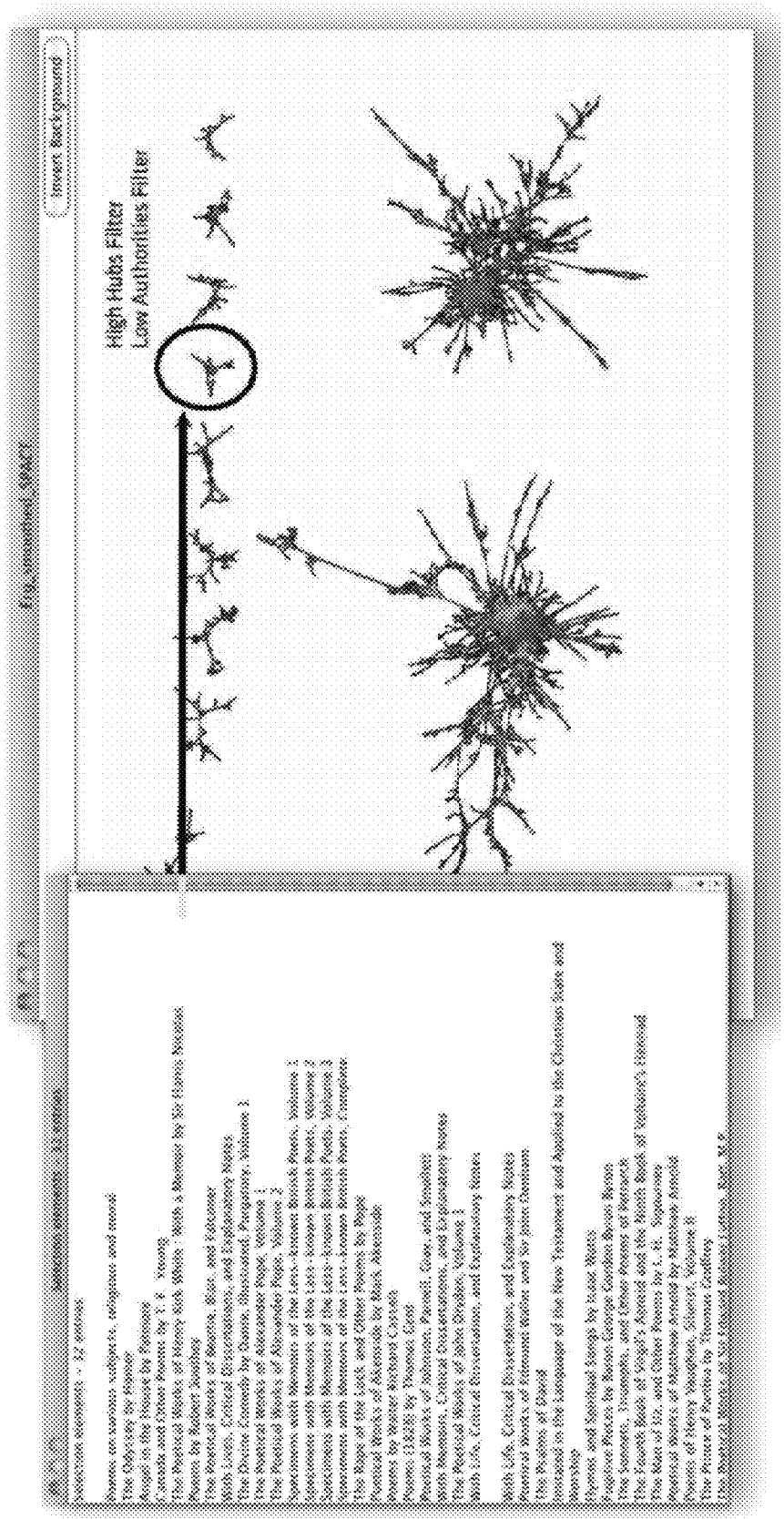
FIG. 17 depicts a selection of a connected component of the graph with the hub and authorities lenses.

FIG. 17 depicts a selection of a connected component of the graph with the hub and authorities lenses. The selection indicates documents that have high hubs lens values as well as low authorities lens values. Hubs words are very descriptive, such as crimson, while authority words are more concrete, such as red. Group of documents in the selected structure are all works of poetry, highlighting the heavy use of colorful, descriptive language within this genre.

Figure 18:
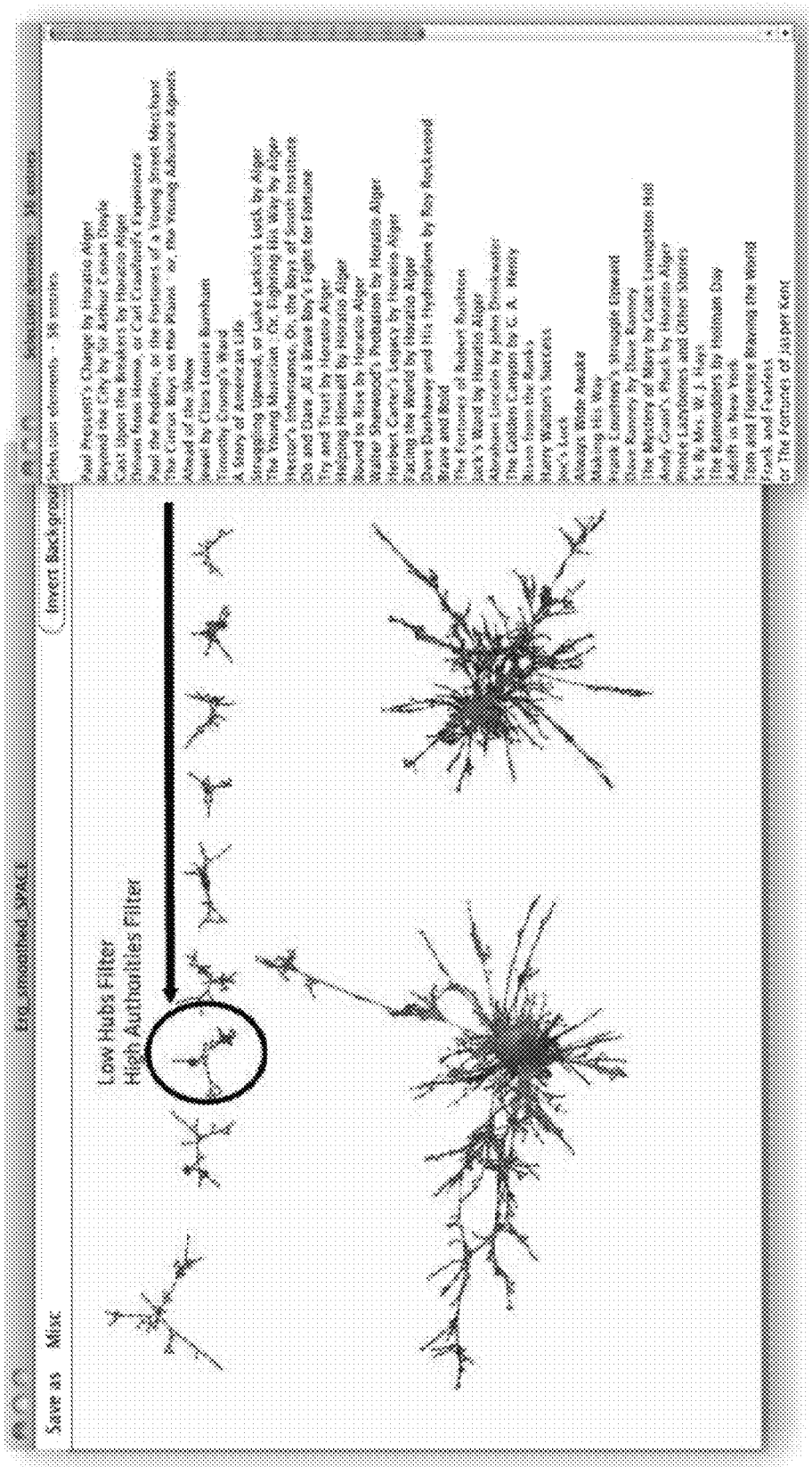
FIG. 18 depicts a selection of the graph with the hub and authorities lenses that highlights a connected component which contains documents that have high authority words and low hub words.

FIG. 18 depicts a selection of the graph with the hub and authorities lenses that highlights a connected component which contains documents that have high authority words and low hub words. These works are so-called "rags to riches" books, often described as "formulaic juvenile novels." These works make heavy use of more simple, authoritative words, such as red, as opposed to the more arcane hubs words, such as crimson.

Figure 19:
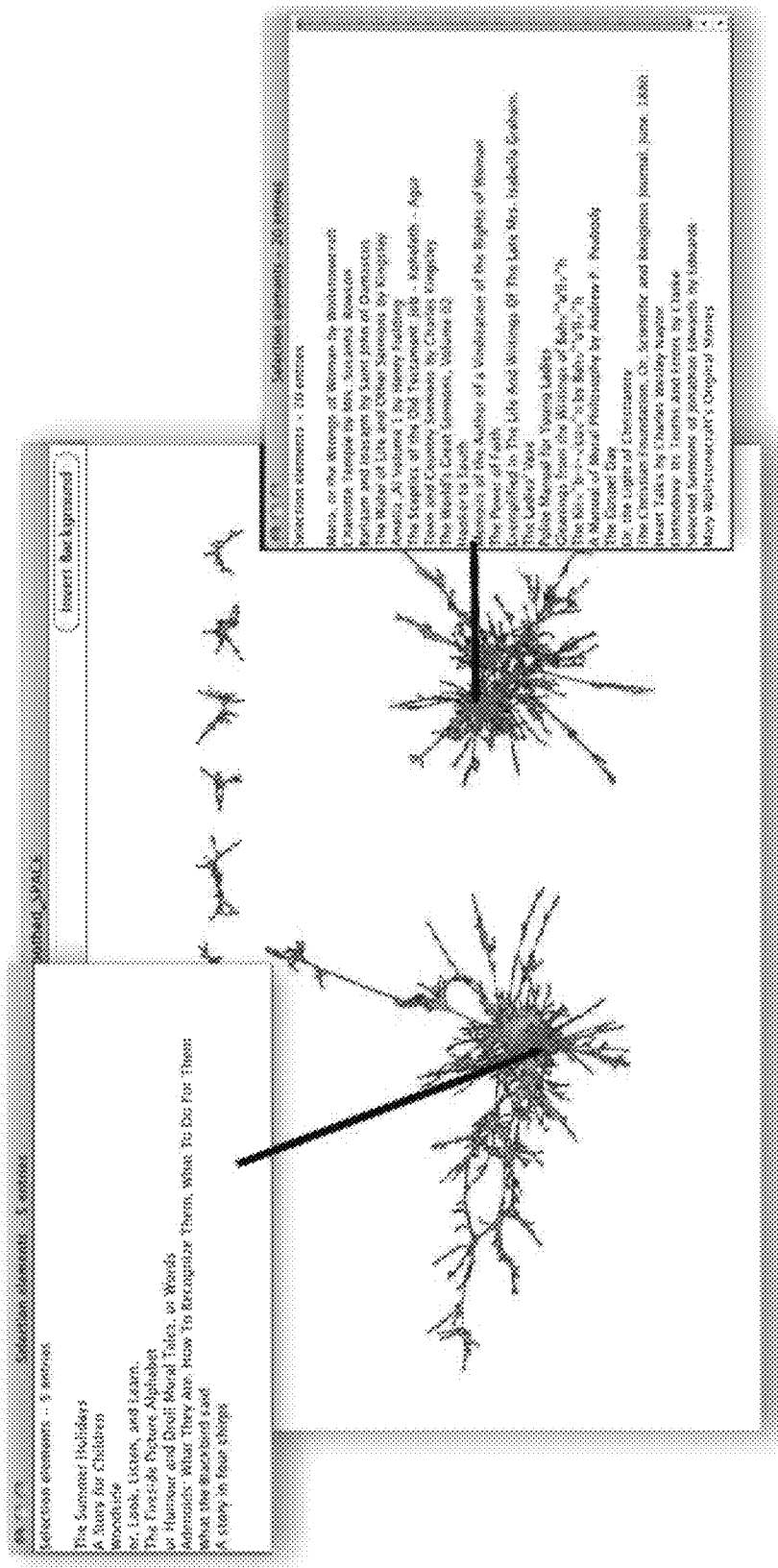
FIG. 19 depicts selections of the graph with the hub and authorities lenses that highlights two sets of documents.

FIG. 19 depicts selections of the graph with the hub and authorities lenses that highlights two sets of documents. The first set has low values for both the hubs and authorities lenses, and the second set has with high values for both. In the group on the left in FIG. 19, contains documents have low hubs and low authorities values. These are texts rich in illustrations and mostly young children's picture books. Because of the quantity of illustrations and the simple language, these works contained relatively fewer words with hyponyms and hypernyms. By contrast, the group of works on the right of FIG. 19 contains an interesting combination of sermons together with early feminist writings. This is not surprising, as these documents center around common themes that make heavy usage of similar hub and authority language.

The preceding examples show that smoothing is both usable and of practical value. The following includes at least some variant embodiments. As a first example, consider column smoothing on a data set comprising two corpora, including movie scripts and contracts associated with the movie business. An attempt to identify movies by genre would likely make use of a thesaurus, which would associate "villain" and "bad guy," "explosion" and "fireball," etc. It is quite possible these same associations might be useful for contracts, but it is also likely each class of document has technical terms that are vastly different in one class while being synonyms in the other. Also, movie scripts would probably have other data associated with them, such as the price paid for the script, production costs (if the movie were made) and box office figures (if released). These columns may not be smoothed using a thesaurus.

The Gutenberg example above also showed that the form of column averaging can depend on the nature of the metric. For example, for a Euclidean metric the most natural averaging is likely the raw numbers, but for a tf-idf metric, improved results may be based on raw word counts (the final coordinates were calculated). Second, when the column space has more structure than just distance, this additional information might be used. Consider the vector output of word2vec on a corpus. These coordinatizations may preserve interesting semantic information: for instance, for a reasonable general interest corpus, the vector difference between "man" and "woman" may be very close to the vector difference between "king" and "queen." Therefore, one might easy imagine a smoothing operation could use such information. Specifically, if one wished to explore gender in a corpus set, smoothing may be performed within authors of the same sex. But smoothing may be restricted to pairs of columns whose difference was sufficiently orthogonal (or, alternatively, parallel to) the difference between the vectors for "man" and "woman."

In some embodiments, not all columns may be smoothed. A column indicating whether or not a movie was made would naturally not be something to smooth. More generally, a column taking on discrete values is may be or should not be "smoothable," and is more likely to be used to partition the state for smoothing: that is, rows with classification "A" are smoothed apart from all other values. However, the situation may be more complex: consider movies classified by target audience age. In some embodiments, adjacent categories may be smoothed together, but it is far less likely to be appropriate to do the same for movies for small children and adult dramas.

Row smoothing may be similar to column smoothing. In some embodiments, some exogenous state may be incorporated: smoothing the rows using this state then makes the data set amenable to existing techniques while still using the additional state. For example, consider the case of a marketing dataset of individuals who are potential clients for a chain of sporting goods stores. Suppose the data includes zip codes, income estimates, home ownership, height, weight, age, sex, marital status, number of children, etc. Suppose the exogenous data is some representation of the individuals' connections and preferences on a social networking site. Estimating a person's activity preferences from their age, height, weight, sex, and income is likely more accurate than not using such information, and making use of social networking information would probably make these results better (certainly people who "like" a given professional team is some evidence of their interest in the sport). However, smoothing height and weight without reference to either age, or gender, seems very likely to be counterproductive.

In another example of column smoothing, we may take an indicator set (e.g., weight some subset of the columns with a default value, such as 1.0) and perform smoothing. The smoothed weights may be "reference values" and we compare a given row with this reference value. The reference value may be treated as a fictitious point in the space and compute the nominal distance between each real point and the reference point, but other real-valued operations, such as taking a normalized inner product, are also available.

Further, if the exogenous data on the columns has some non-trivial structure, such as a directed graph, we can compute a real-valued score for each column which is a part of that structure (such as a hubs score for the directed graph of words), and combine those scores to compute a score for the entire row (such as summing the suitably normalized raw word-count coordinates or the tf-idf coordinates). As another example, if the columns are in a general metric space, MDS or tSNE can be used to get one or more coordinates, and these coordinates may be used to compute row weights. The hubs and authorities example shows that if these "column values" are meaningful, the resulting lenses can be very useful.

By a vector of dimension d and value space V we mean a d-tuple of elements of V. (A value space can be a space of discrete tags, real numbers plus infinities and various types of nulls, strings, nodes in a graph, a representation of points in some abstract metric space, or pretty much anything else.) By a matrix D we mean a collection of c vectors (the "columns"), each of dimension r (the number of rows). The value space for the j-th column is denoted by TAD). The k-th row of D is denoted $D^k$. The k-th column of D is denoted $D^k$.

The space of rows of D, denoted R(D) may be the Cartesian product of P(D) for $j \in 1, \ldots, c$. A matrix may also be regarded as a map from $1, \ldots, r$ into the space of rows. The same analog of space of columns, C(D) exists for D, except elements are unrelated unless they have the same value space.

The matrix also has a set of "column spaces" associated with it. A column space is an abstract space the points of which are thought of as the "underlying meaning" of a column in a rectangle (e.g., a specific word in a bag-of-words rectangle for a corpus). In a matrix, the value space for such a "word column" would be the real numbers, and the column space would be the space of words with, say, the metric induced by word2vec coordinates. The intuition here is that the rows or columns, or both, are somehow associated with some additional structured state which is at least a topological space.

There is the corresponding idea of "row spaces." Entries are, at least formally, automatically commensurate. However, as we described in the movie scripts and contracts example, even though the columns formally are of the same type, they may well be unrelated (typically the different spaces have "unshared" columns where each space has real values in some of these columns and the rest of the spaces have only nulls there, and there is usually a single column with a tag to indicate the space-type).

We may use X to denote a "submatrix of D" (i.e., a rectangle formed by taking all the entries for a subset of rows crossed with a subset of the columns). A column smoothing operator S on a matrix X is a pair (sc, M). sc is a subset of the columns of X, called the smoothing columns, which must all have the same column space, C·M: $C \times \ldots \times C \times R(X) \to R(X)$. M must be the identity on all columns not in sc, be continuous, and have the same symmetries on the output as those in the smoothing columns. To be more specific about the exemplary symmetry condition, if the column indices of sc in X include 1 and 5, and the values in C for the indices 1 and 5 are identical, then the value of M must be identical in those columns as well. As an example, if X is a subrectangle of the data set of movie scripts and contracts, a function which does WordNet smoothing on some subset of the word columns, where the precise parameters of the function depends on the values of one or more of the entries in a non-smoothing column, is an example of such a function. "Applying" S to X means overwriting the entries of X with the values of S on the rows of X A column smoothing operation on D is a finite sequence of subrectangles $X_1$ and smoothing operators $S_1$ on those subrectangles, such that the results are applied sequentially, either to copies of D or to D itself.

Smoothing on rows may be rather different. A row smoothing operator S on a matrix X is a pair (sc, M). sc is a subset of the columns of X, called the smoothing columns, all of the rows of X have the same row space R, and $M: R \times \ldots \times R \times X \to X$. M must be continuous, have the same symmetries on the smoothed output columns as the inputs from $R \times \ldots \times R$, and be the identity on the complement of sc. As an example, if X is the subrectangle of women over 40 with three or more children in the sporting goods database, sc could be the columns for height, weight, and income. The row smoothing operator may have access to all of the fields of the submatrix, which is a big difference from column smoothing operators. The reason for this additional complexity may be that while smoothing on related columns within a row makes intuitive sense as described, the analog for rows would not make sense with "row" and "column" switched in the description. In the column-smoothing case the intuition is each column may be thought of as a random variable which might not be measured accurately in every row. Using the fact that we "expect," a priori, column 1 to behave a certain way with respect to "column 2" suggests that enforcing this expectation will accentuate a signal; the Gutenberg example shows this may be so.

The row smoothing case is different. While there are cases when D and its transpose may be thought of perfectly symmetrical, this is far more often not so. Suppose the matrix D is a noisy track of a 1000-dimensional dynamical system. Then one natural application of row smoothing would be to fit a linear model to D locally in windows of time, to smooth away the noise, and this is impossible a column at a time.

Instead of row smoothing, in some embodiments, one could add columns containing the "additional information" and take a weighted sum of the original metric and the new metric on the new columns. That is, social networking information may be incorporated with standard marketing data by adding "networking columns." Naturally the results may not be identical, and such data, in some embodiments, may not be exported to use with other tools, but we have found this approach to be very effective, and more tolerant of noise (instead of having outliers infect the smoothed data, they are too far away to effect the graphs).

Figure 20:
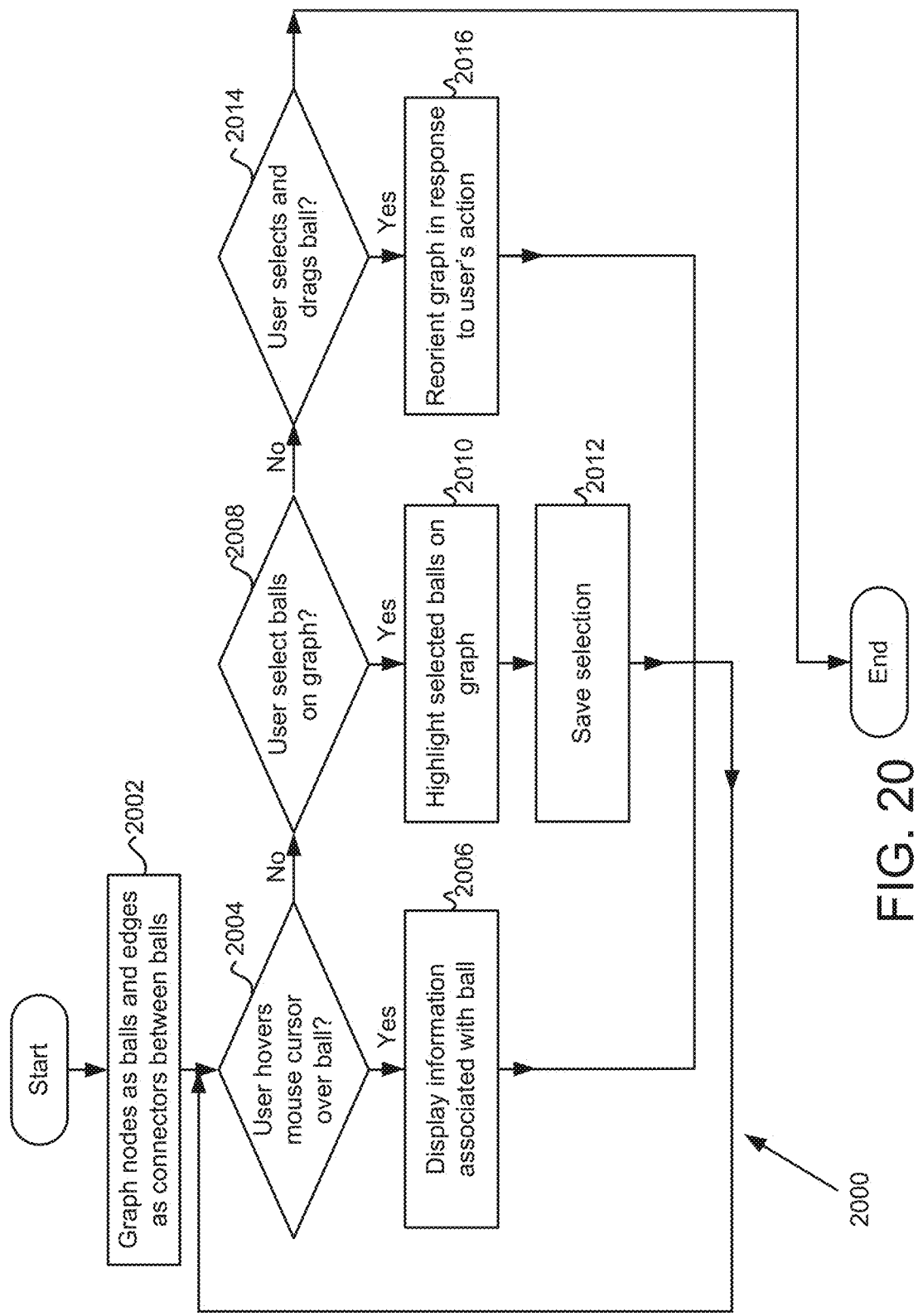
FIG. 20 is a flowchart of functionality of the interactive visualization in some embodiments.

FIG. 20 is a flowchart 2000 of functionality of the interactive visualization in some embodiments. In step 2002, the visualization engine 222 receives the analysis from the analysis module 108 and graphs nodes as balls and edges as connectors between balls 2102 to create interactive visualization 500 (see FIG. 5).

In step 2004, the visualization engine 222 determines if the user is hovering a mouse cursor (or has selected) a ball (i.e., a node). If the user is hovering a mouse cursor over a ball or selecting a ball, then information is displayed regarding the data associated with the ball. In one example, the visualization engine 222 displays a node information window 508.

If the visualization engine 222 does not determine that the user is hovering a mouse cursor (or has selected) a ball, then the visualization engine 222 determines if the user has selected balls on the graph in step 2008 (e.g., by clicking on a plurality of balls or drawing a box around a plurality of balls). If the user has selected balls on the graph, the visualization engine 222 may highlight the selected balls on the graph in step 2010. The visualization engine 222 may also display information regarding the selection (e.g., by displaying a selection information window). The user may also click on the explain button 522 to receive more information associated with the selection (e.g., the visualization engine 222 may display the explain information window).

In step 2012, the user may save the selection. For example, the visualization engine 222 may save the underlying data, selected metric, filters, and/or resolution. The user may then access the saved information and create a new structure in another interactive visualization 500 thereby allowing the user to focus attention on a subset of the data.

If the visualization engine 222 does not determine that the user has selected balls on the graph, the visualization engine 222 may determine if the user selects and drags a ball on the graph in step 2014. If the user selects and drags a ball on the graph, the visualization engine 222 may reorient the selected balls and any connected edges and balls based on the user's action in step 2016. The user may reorient all or part of the structure at any level of granularity.

Figure 21:
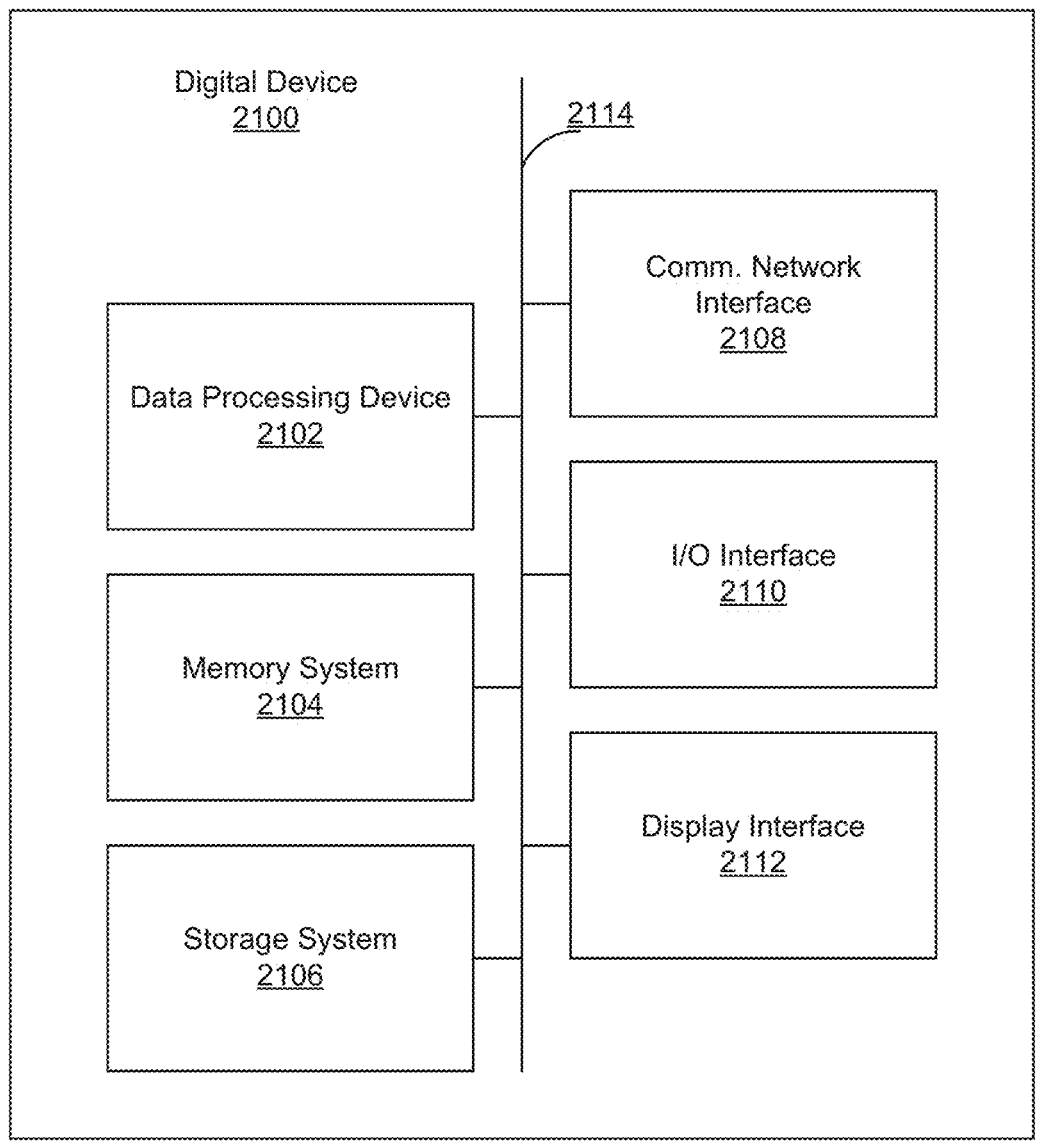
FIG. 21 is an exemplary digital device in some embodiments.

It will be appreciated that although FIG. 21 discussed the user hovering over, selecting, and/or dragging a ball, the user may interact with any object in the interactive visualization 500 (e.g., the user may hover over, select, and/or drag an edge). The user may also zoom in or zoom out using the interactive visualization 500 to focus on all or a part of the structure (e.g., one or more balls and/or edges).

Further, although balls are discussed and depicted in FIGS. 5 and 6, it will be appreciated that the nodes may be any shape and appear as any kind of object. Further, although some embodiments described herein discuss an interactive visualization being generated based on the output of algebraic topology, the interactive visualization may be generated based on any kind of analysis and is not limited.

FIG. 21 is a block diagram of an exemplary digital device 2100. The digital device 2100 comprises a processor 2102, a memory system 2104, a storage system 2106, a communication network interface 2108, an I/O interface 2110, and a display interface 2112 communicatively coupled to a bus 2114. The processor 2102 may be configured to execute executable instructions (e.g., programs). In some embodiments, the processor 2102 comprises circuitry or any processor capable of processing the executable instructions.

The memory system 2104 is any memory configured to store data. Some examples of the memory system 2104 are storage devices, such as RAM or ROM. The memory system 2104 can comprise the ram cache. In various embodiments, data is stored within the memory system 2104. The data within the memory system 2104 may be cleared or ultimately transferred to the storage system 2106.

The storage system 2106 is any storage configured to retrieve and store data. Some examples of the storage system 2106 are flash drives, hard drives, optical drives, and/or magnetic tape. In some embodiments, the digital device 2100 includes a memory system 2104 in the form of RAM and a storage system 2106 in the form of flash data. Both the memory system 2104 and the storage system 2106 comprise computer readable media which may store instructions or programs that are executable by a computer processor including the processor 2102.

The communication network interface (com. network interface) 2108 can be coupled to a data network (e.g., data network 504 or 514) via the link 2116. The communication network interface 2108 may support communication over an Ethernet connection, a serial connection, a parallel connection, or an ATA connection, for example. The communication network interface 2108 may also support wireless communication (e.g., 1802.11 a/b/g/n, WiMax). It will be apparent to those skilled in the art that the communication network interface 2108 can support many wired and wireless standards.

The optional input/output (I/O) interface 2110 is any device that receives input from the user and output data. The optional display interface 2112 is any device that may be configured to output graphics and data to a display. In one example, the display interface 2112 is a graphics adapter.

It will be appreciated by those skilled in the art that the hardware elements of the digital device 2100 are not limited to those depicted in FIG. 21. A digital device 2100 may comprise more or less hardware elements than those depicted. Further, hardware elements may share functionality and still be within various embodiments described herein. In one example, encoding and/or decoding may be performed by the processor 2102 and/or a co-processor located on a GPU.

The above-described functions and components can be comprised of instructions that are stored on a storage medium (e.g., a computer readable storage medium). The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

The invention claimed is:

1. A non-transitory computer readable medium comprising instructions, the instructions being executable by a processing device processor to perform a method, the method comprising:

receiving a set of document identifiers, a plurality of text segments, and a plurality of frequency values, each document identifier of the set of document identifiers identifying one of a plurality of documents, each of the plurality of text segments being associated with a particular document identifier of the set of document identifiers, each of the plurality of text segments being in at least one document of the plurality of documents which is identified by the particular document identifier, and each of the plurality of frequency values indicating a number of instances of a corresponding text segment in a corresponding document of the plurality of documents;

receiving an indication of a relationship between a first text segment of the plurality of text segments and a second text segment of the plurality of text segments, the first text segment being associated with a first frequency value of the plurality of frequency values, the second text segment being associated with a second frequency value of the plurality of frequency values;

adjusting, for each document, the second frequency value based on a frequency value of the first frequency value;

projecting each frequency value of the plurality of frequency values into a reference space to generate a set of projection values in the reference space;

identifying a plurality of subsets of the reference space, at least some of the plurality of subsets including at least some of the projection values of the set of projection values in the reference space;

clustering, for each subset of the plurality of subsets, at least some documents of the set of documents that correspond to a subset of the set of projection values to generate clusters of one or more documents; and generating a graph of nodes, each of the nodes identifying one or more of the documents corresponding to each cluster.

2. The computer readable medium of claim 1, wherein clustering, for each subset of the plurality of subsets, at least some documents of the set of documents comprises:

determining a distance between at least two documents of the set of documents corresponding to at least two projection values in a first subset of the plurality of subsets;

comparing the distance to a threshold value; and clustering each of the at least two documents in two different clusters or one cluster based on the comparison.

3. The computer readable medium of claim 1, wherein generating the graph of nodes comprises generating a graphical representation of the graph of nodes.

4. The computer readable medium of claim 1, the method further comprising generating a link between at least two nodes of the graph of nodes, each node corresponding to different clusters, a first document of the set of documents being a member of the different clusters.

5. The computer readable medium of claim 4, wherein generating the graph of nodes comprises generating a graphical representation of the graph of nodes and generating the link comprises generating an edge between the at least two nodes.

6. The computer readable medium of claim 1, wherein the plurality of subsets of the reference space have a non-empty intersection.

7. The computer readable medium of claim 1, wherein adjusting, for each document, the second frequency value based on a frequency value of the first frequency value comprises generating a third frequency value based on the frequency value of the first frequency value and leaving the second frequency value unchanged.

8. The computer readable medium of claim 1, wherein projecting each frequency value comprises projecting each frequency value, including each of the adjusted frequency values, into the reference space to generate the set of projection values in the reference space.

9. The computer readable medium of claim 8, wherein the second frequency value remains unchanged.

10. The computer readable medium of claim 1, wherein the text segments are from at least one dictionary of text segments.

11. The computer readable medium of claim 1, wherein one or more of the text segments are words.

12. The computer readable medium of claim 1, wherein one or more of the text segments are n-grams.

13. The computer readable medium of claim 1, wherein each frequency value is a term frequency-inverse document frequency for the corresponding text segment and the corresponding document.

14. A system comprising:

at least one processor;

memory including executable instructions, the executable instructions being executable by the at least one processor to control the at least one processor to:

receive a set of document identifiers, a plurality of text segments, and a plurality of frequency values, each document identifier of the set of document identifiers identifying one of a plurality of documents, each of the plurality of text segments being associated with a particular document identifier of the set of document identifiers, each of the plurality of text segments being in at least one document of the plurality of documents which is identified by the particular document identifier, and each of the plurality of frequency values indicating a number of instances of a corresponding text segment in a corresponding document of the plurality of documents;

receive an indication of a relationship between a first text segment of the plurality of text segments and a second text segment of the plurality of text segments, the first text segment being associated with a first frequency value of the plurality of frequency values, the second text segment being associated with a second frequency value of the plurality of frequency values;

adjust, for each document, the second frequency value based on a frequency value of the first frequency value;

project each frequency value of the plurality of frequency values into a reference space to generate a set of projection values in the reference space;

identify a plurality of subsets of the reference space, at least some of the plurality of subsets including at least some of the projection values of the set of projection values in the reference space;

cluster, for each subset of the plurality of subsets, at least some documents of the set of documents that correspond to a subset of the set of projection values to generate clusters of one or more documents; and generate a graph of nodes, each of the nodes identifying one or more of the documents corresponding to each cluster.

15. The system of claim 14, wherein clustering, for each subset of the plurality of subsets, at least some documents of the set of documents comprises:

determining a distance between at least two documents of the set of documents corresponding to at least two projection values in a first subset of the plurality of subsets;

comparing the distance to a threshold value; and clustering each of the at least two documents in two different clusters or one cluster based on the comparison.

16. The system of claim 14, wherein generating the graph of nodes comprises generating a graphical representation of the graph of nodes.

17. The system of claim 14, the method further comprising generating a link between at least two nodes of the graph of nodes, each node corresponding to different clusters, a first document of the set of documents being a member of the different clusters.

18. The system of claim 17, wherein generating the graph of nodes comprises generating a graphical representation of the graph of nodes and generating the link comprises generating an edge between the at least two nodes.

19. The system of claim 14, wherein the plurality of subsets of the reference space have a non-empty intersection.

20. The system of claim 14, wherein adjusting, for each document, the second frequency value based on a frequency value of the first frequency value comprises generating a third frequency value based on the frequency value of the first frequency value and leaving the second frequency value unchanged.

21. The system of claim 14, wherein projecting each frequency value comprises projecting each frequency value, including each of the adjusted frequency values, into the reference space to generate the set of projection values in the reference space.

22. The system of claim 21, wherein the second frequency value remains unchanged.

23. The system of claim 14, wherein the text segments are from at least one dictionary of text segments.

24. The system of claim 14, wherein one or more of the text segments are words.

25. The system of claim 14, wherein one or more of the text segments are n-grams.

26. The system of claim 14, wherein each frequency value is a term frequency-inverse document frequency for the corresponding text segment and the corresponding document.

* * * * *